US006831587B1

(12) United States Patent
Joshi

(10) Patent No.: US 6,831,587 B1
(45) Date of Patent: Dec. 14, 2004

(54) PRIORITY ENCODING

(75) Inventor: Mayur Joshi, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 10/630,757

(22) Filed: Jul. 31, 2003

(51) Int. Cl.$^7$ ................................................ H03M 1/36
(52) U.S. Cl. .................... 341/160; 365/49; 365/230.06; 711/108; 711/158
(58) Field of Search ............................ 341/160; 365/49, 365/230; 711/108, 158

(56) References Cited

U.S. PATENT DOCUMENTS

| | | | | |
|---|---|---|---|---|
| 4,115,855 A | * | 9/1978 | Chiba ......................... | 711/158 |
| 4,887,084 A | * | 12/1989 | Yamaguchi .................. | 341/160 |
| 4,928,260 A | | 5/1990 | Chuang et al. | |
| 5,123,105 A | * | 6/1992 | Wyland et al. .............. | 710/244 |
| 5,511,222 A | * | 4/1996 | Shiba et al. ................. | 341/160 |
| 5,555,397 A | * | 9/1996 | Sasama et al. ............... | 711/158 |
| 5,602,545 A | * | 2/1997 | Ishii et al. ..................... | 341/50 |
| 5,714,949 A | * | 2/1998 | Watabe ......................... | 341/67 |
| 5,964,857 A | * | 10/1999 | Srinivasan et al. .......... | 710/244 |
| 6,331,942 B1 | | 12/2001 | Peterson | |
| 6,392,910 B1 | * | 5/2002 | Podaima et al. .............. | 365/49 |
| 6,420,990 B1 | * | 7/2002 | Voelkel ........................ | 341/160 |
| 6,462,694 B1 | | 10/2002 | Miyatake | |
| 6,493,793 B1 | | 12/2002 | Pereira et al. | |
| 6,580,652 B2 | * | 6/2003 | Roth et al. ................... | 365/203 |
| 6,643,733 B2 | * | 11/2003 | Akkary ........................ | 711/108 |
| 6,693,814 B2 | * | 2/2004 | McKenzie et al. ............ | 365/49 |
| 2003/0016575 A1 | | 1/2003 | Regev | |

OTHER PUBLICATIONS

Nick McKeown, "How Scalable is the capacity of (electronic) Ip routers?", Stanford University, pp. 1–36, unknown published date.
Nick McKeown, "Memory for High Performance Internet Routers", Stanford University, pp. 1–31, unknown published date.

* cited by examiner

*Primary Examiner*—Michael Tokar
*Assistant Examiner*—Khai Nguyen
(74) *Attorney, Agent, or Firm*—Dickstein Shapiro Morin & Oshinsky LLP

(57) ABSTRACT

A priority encoder includes static, tree-like product circuitry that responds to input signals, providing subset signals for subsets of the input signals. The subset signals can be for power-of-two subsets such as 1, 2, 4, 8, etc. input signals. The priority encoder also includes dynamic, tree-like priority circuitry that responds to the subset signals, providing priority signals, each indicating whether a respective input line is asserted and has priority. Each output line of the priority circuitry can be controlled by a group of transistors in series, with a respective transistor for each of a non-redundant set of the subset signals. A priority encoder can include a number of lower level priority encoding circuits and one upper level priority encoding circuit that receives overall signals from the lower circuits.

44 Claims, 15 Drawing Sheets

PRIORITY ENCODING

This application is related to U.S. patent application Ser. No. 10/630,812 filed Jul. 31, 2003, entitled "Obtaining Search Results for Content Addressable Memory", which is incorporated by reference herein in its entirety.

FIELD OF THE INVENTION

The invention relates to techniques for priority encoding. The priority encoding techniques can be applied, for example, in a content addressable memory (CAM).

BACKGROUND OF THE INVENTION

Various techniques for priority encoding (also known as resolving multiple responses) are known. Priority encoding has many different applications but is usually used to obtain a location of a selected response source. An exemplary application is in content addressable memory (CAM), where priority encoding is typically performed on the match signals from a CAM array to obtain a location of a priority matching entry, which can be thought of as the highest or lowest priority matching entry.

FIG. 1 shows features of a previously proposed priority encoding (PE) system 10. PE system 10 has M input lines that receive response signals $R_0$ through $R_{M-1}$ from M sources. In response, system 10 provides priority signals $P_0$ through $P_{M-1}$ on M output lines to a standard binary encoder (not shown). Priority signal $P_i$ indicates that the respective response signal $R_i$ is asserted and has priority; only one of priority signals $P_0$ through $P_{M-1}$ is asserted at a time.

FIG. 1 shows circuitry 12 for the ith input line, and system 10 includes similar circuitry for each of the other input lines. System 10 includes priority encoder (PE) latch 14, which includes a flip-flop in each line's circuitry, as illustrated by flip-flop 16 in circuitry 12. System 10 also includes a responder (RSP) and ripple inhibit chain 20 and NAND gate array 22.

In operation, response signals $R_0$ through $R_{M-1}$ are first stored in PE latch 14, while RSP_b line 24 and inhibit line $I_{i+1}$ 26 are precharged high. If there are any responders, RSP_b line 24 is pulled low by $M_3$ transistor 28 in response to signal $D_i$ from the Q output of flip-flop 16. RSP_b line 24 serves as an N-input OR gate indicating whether there are any responders among the sources of response signals $R_0$ through $R_{M-1}$. If there is a responder on the ith line $R_i$, $M_2$ transistor 30 turns on in response to $D_i$, pulling down the potential of $I_{i+1}$ line 26. This does not affect the inhibit lines for prior lines (i.e. for $I_i$, $I_{i-1}$, ... $I_0$), since $M_1$ transistor 32 is turned OFF by signal $D_i$_b from the not Q output (labeled Q_b) of flip-flop 16.

If the source of $R_i$ is the uppermost responder, i.e. if none of the prior response signals $R_0$ through $R_{i-1}$ is asserted, the $I_i$ line is still at Vdd and the output of NAND gate 34 goes low when the Q output of flip-flop 16 goes high. The low output from NAND gate 34 indicates that $R_i$ is asserted and has priority. Only one of the NAND gates in array 22 can be low at any time. The outputs of all the NAND gates in array 22 therefore form a one-of-M signal that is provided to the binary encoder (not shown), which returns the binary address of the uppermost responder.

Performance of the PE system described above is limited by the speed of the inhibit chain that includes inhibit lines $I_0$ through $I_M$, including inhibit line $I_{i+1}$ 26. Without lookahead, speed is related to the delay through inhibit pass transistors, including transistor 32. The inhibit pass chain can be modeled as a lumped RC ladder network. The inhibit chain's delay is directly related to resistance of transistor 32 and the other inhibit pass transistors and to the capacitance of the inhibit lines.

Performance of the PE system can be improved by breaking the inhibit chain into sections and inserting a non-inverting buffer between sections. The number of units per section can be chosen to minimize delay.

Performance can be further improved by using lookahead so that the inhibit signal does not have to propagate through all the sections of the inhibit chain. A long linear structure can be replaced by a branched tree-like structure that has less latency. The RSP_b signal, if sufficiently fast, is used to generate all necessary lookahead information. This is done by breaking the RSP chain into buffered sections such that each section is isolated from those below and therefore sends the proper signal to appropriate inhibit chains. The delay of the RSP chain can also be minimized.

FIG. 2 shows tree structure 40, which can aid in speeding up RSP and ripple inhibit chain 20. Tree structure 40 can be used, for example, in a PE system with 64 inputs and eight sections. Each section has eight of the input lines as in FIG. 1 and each also has a common RSP_B line 24 and a continuous inhibit chain with $I_{i+1}$ line 26. Tree structure 40 illustratively receives signals RSP_$b_1$ through RSP_$b_7$ from the RSP and ripple inhibit chain 20 of each of the first seven sections, sections 1 through 7. In response, tree structure 40 provides section inhibit signals $SI_2$ through $SI_8$ to the inhibit line of each of the last seven sections. In the illustrated circuit, the eighth section's signal RSP_$b_8$ is not used to obtain section inhibit signals because there is no ninth section.

If a section's RSP_$b_j$ signal is low, indicating a match in the section, or if a prior section's RSP_b signal is low, logic components 42 through 58, each of which could be an AND gate, provide a low section inhibit signal $SI_{j+1}$ for the next section. For example, if inputs 3 and 62 are asserted, then RSP_$b_1$ and RSP_$b_7$ will each be asserted, i.e. low. Tree structure 40 will assert all of the section inhibit signals $SI_2$ through $SI_8$, inhibiting sections 2 through 8 from providing any asserted outputs. As a result, $P_3$ would be asserted, but $P_{62}$ would not.

Tree structure 40 improves performance because each section's RSP_$b_j$ signal is obtained more rapidly than the inhibit signal from its last line because transistor 28 (and its counterpart for other lines in the section) obtain RSP_$b_j$ in parallel rather than in series like transistor 32 (and its counterparts for other lines in the section). The section inhibit signal $SI_{j+1}$ therefore becomes available before the inhibit signal from the last line of the previous section would be available if the sections were connected without tree structure 40. If logic components 42 through 58 each include one AND gate, the worst case delay will occur when a signal passes through three AND gates, such as RSP_$b_4$ through components 46, 48, and 50 or RSP_$b_6$ through components 52, 56, and 58. More generally, for M sections, the delay is proportional to $\log_2 M$.

It would be advantageous to reduce the number of transistors in priority encoders without reducing speed at which results are obtained.

BRIEF SUMMARY OF THE INVENTION

The invention provides improved priority encoding techniques, including priority encoders that can be implemented with relatively few transistors while maintaining priority encoding speed. Some techniques use non-redundant groups of power-of-two subset signals, because such signals can be efficiently obtained from input signals and can also be efficiently used to obtain priority signals. Other techniques provide priority encoders with two circuits: One circuit responds to input signals, providing subset signals; another circuit responds to the subset signals, providing priority signals that indicate at most one input signal that is asserted and has priority. Each of these circuits can be a tree-like structure, the first with static logic and the second dynamic.

These and other features and advantages of the invention will be apparent from the following detailed description and drawings.

DETAILED DESCRIPTION OF THE INVENTION

Figure 3:
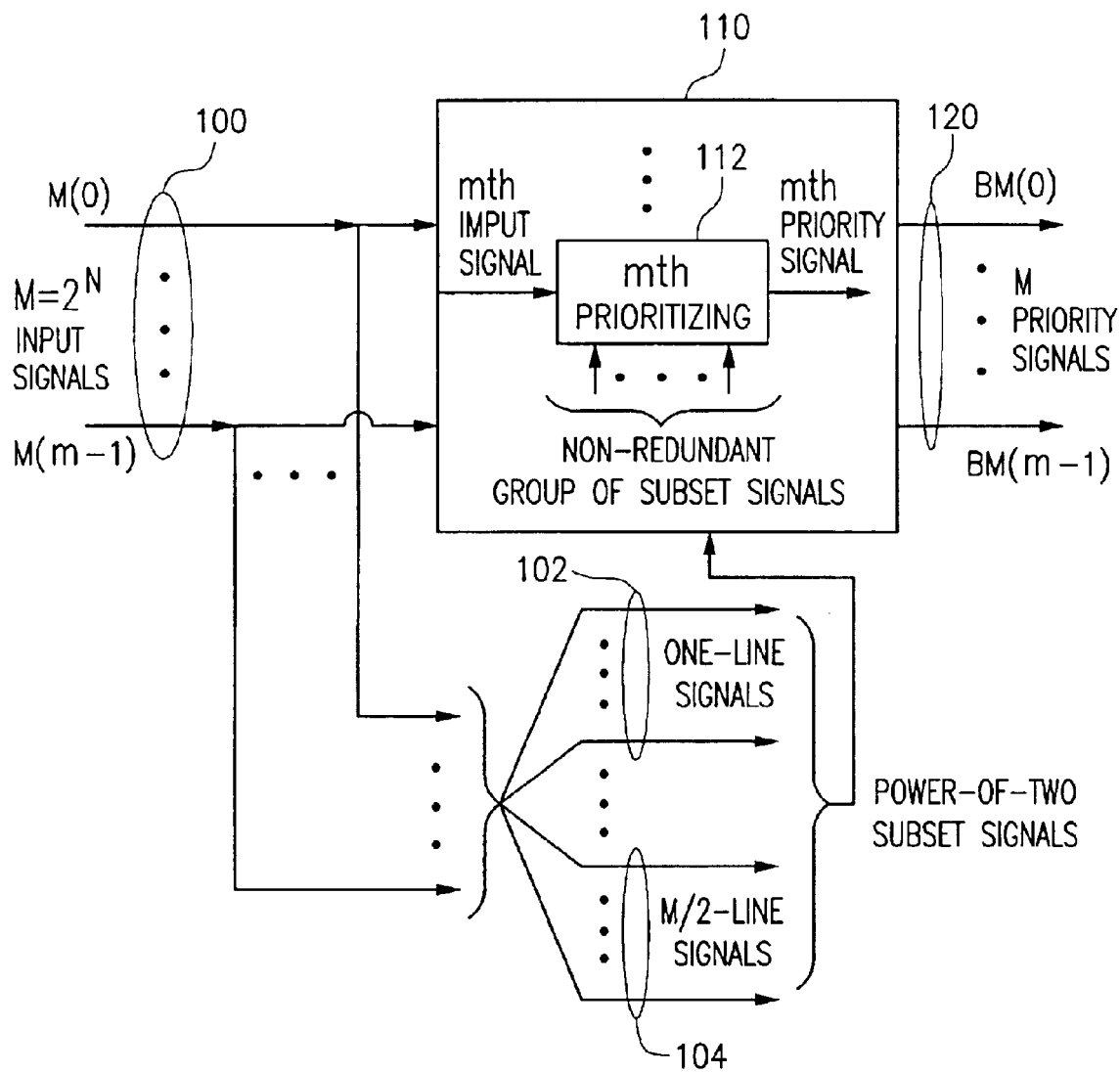
FIG. 3 is a schematic flow diagram showing how priority encoding can be performed using non-redundant groups of power-of-two subset signals.

FIG. 3 shows general features of a priority encoding technique using non-redundant groups of power-of-two subset signals. The technique in FIG. 3 begins with M input signals 100, where M is equal to $2^N$. Each input signal could, for example, be a match signal associated with one or more memory locations in a CAM array, and the input signals are therefore illustratively labeled M(0) through M(M−1).

Each "match signal" from a CAM array indicates whether one or more locations satisfy a match criterion applied in searching the CAM array. As used herein, the term "match signal" can refer to a signal indicating search results, however obtained, whether by comparing one memory location's data entry with a search index, by logically combining a number of such comparison results to obtain a combined match signal, or by any other appropriate comparison technique. A search index can, for example, be held in a comparand register, and the match criterion can require a match on some or all bits. As used herein, a match signal is "asserted" when it has a value indicating that one or more locations satisfy a matching criterion; although a bit is sometimes referred to as "on" to indicate that it is asserted, a match signal bit in a given circuit may be asserted when it has either of its values, whether high or low, on or off, "0" or "1", and not asserted when it has the other value.

More generally, input signals 100 could be any signals indicating those of M signal sources that are asserting signals. As used herein, an input signal is "asserted" when it has a value indicating occurrence of a CAM array match or other source event or response; in this context, an input signal bit may be asserted when it has either of its values, whether high or low, on or off, "0" or "1".

Figure 2:
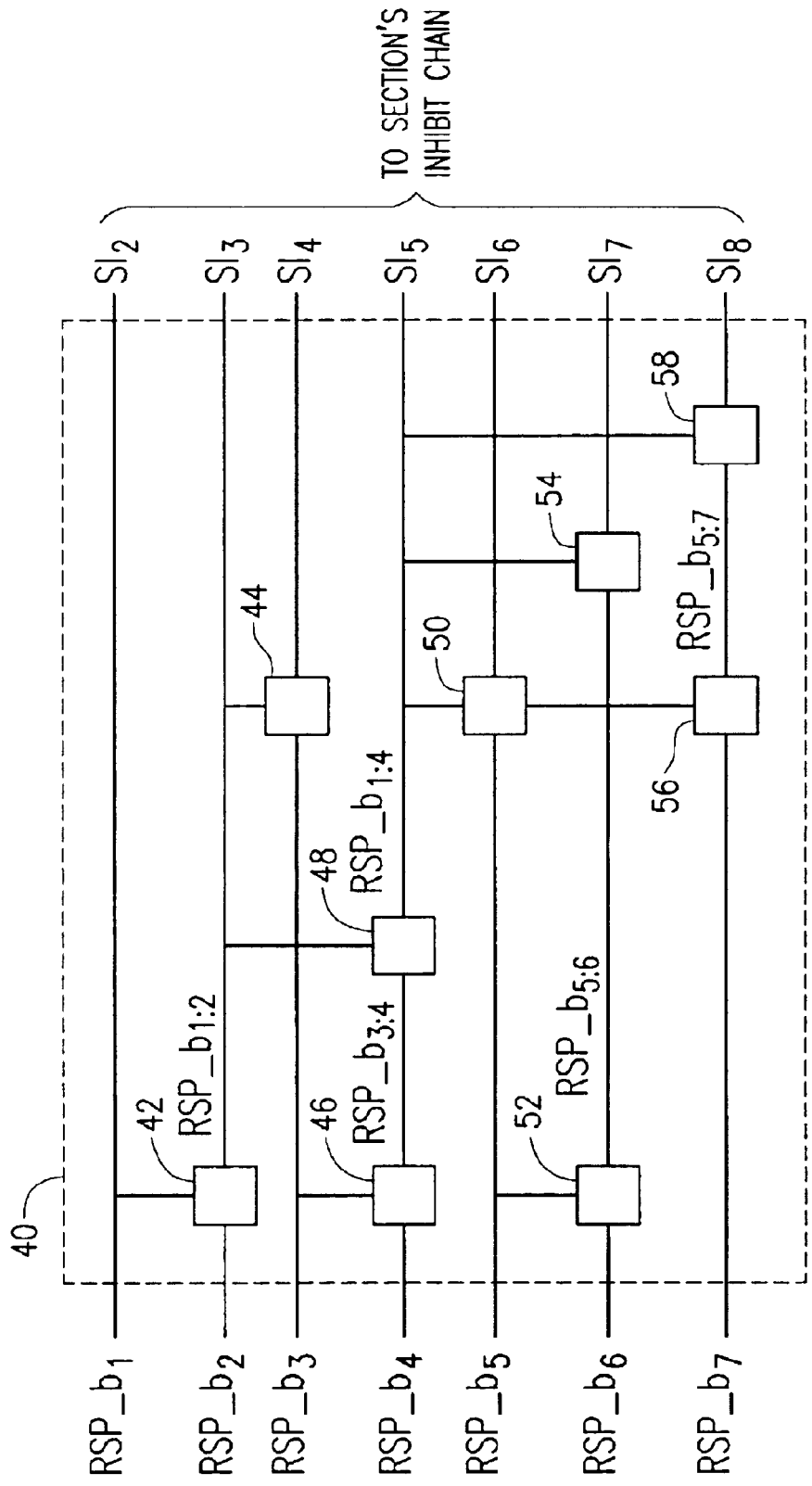
FIG. 2 is a schematic circuit diagram of a tree structure previously proposed for improving performance of the system of FIG. 1

In response to input signals 100, power-of-two subset signals are provided, including one-line signals 102 up to M/2-line signals 104. Each subset signal indicates whether any of a subset of the input signals is asserted. As used herein, a "power-of-two subset" is a subset with $2^k$ elements, where k is a non-negative integer. Accordingly, a "power-of-two subset signal" is a signal indicating a value for a power-of-two subset, such as a subset of 1, 2, 4, 8, etc. In the case of CAM array match signals, each power-of-two subset signal could indicate whether any of a power-of-two subset of the match signals is asserted. In contrast to power-of-two subset signals, the inhibit signals $I_i$ in FIG. 2 indicate values for input signal subsets of all sizes from one through seven, not just power-of-two subsets.

Box 110 illustrates an operation that responds to the power-of-two subset signals 102 through 104. The operation in box 110 includes a prioritizing operation for each of input signals 100, with box 112 illustratively prioritizing for the mth input signal. The operation in box 112 is performed in response to a non-redundant group of the power-of-two subset signals, and provides the mth priority signal. As a result of the prioritizing operations for all of input lines 100, M priority signals 120 are provided, each indicating whether a respective input signal is asserted and has priority. In FIG. 3, priority signals 120 are labeled BM(0) through BM(M−1) to indicate best match signals from the priority encoder of a CAM array. At most one of M priority signals 120 is asserted at a time. Similarly to an input signal, a priority signal is "asserted" when it has a value indicating that a match signal or other input signal is asserted and has priority; in this context, a priority signal bit may be asserted when it has either of its values, whether high or low, on or off, "0" or "1".

As used herein, a "non-redundant group of power-of-two subset signals" is a group of signals for power-of-two subsets that are all mutually exclusive and therefore non-redundant. For fifteen input signals numbered 0 through 14, a non-redundant group of power-of-two subset signals could include an eight-element signal for input signals 0 through 7, a four-element signal for input signals 8 through 11, a two-element signal for input signals 12 and 13, and a one-element signal for input signal 14. Similarly, for eleven input signals numbered 1 through 10, a non-redundant group of power-of-two subset signals could include the eight-element signal for input signals 0 through 7, a two-element signal for input signals 8 and 9, and a one-element signal for input signal 10. For seven input signals numbered 0 through 6, a non-redundant group of power-of-two subset signals could include a four-element signal for input signals 0 through 3, a two-element signal for input signals 4 and 5, and a one-element signal for input signal 6. For three input signals numbered 0 through 2, a non-redundant group of power-of-two subset signals could include a two-element signal for input signals 0 and 1 and a one-element signal for input signal 2.

One way to obtain a non-redundant group of power-of-two subset signals from M input signals received on M input lines is to assign binary numbers to the input lines from zero to (M−1), then use a group of subset signals indicated by each line's binary number. For example, the zeroth input signal would have no power-of-two subset signals in its group, while the (M−1)th input signal would have one of each size from a two-line signal up to an M/2-line signal. The group for each input signal assigned an odd number would also have a subset signal for the next lower input signal, which would not need to be separately obtained since it is already available as one of input signals 100.

A feature of the technique in FIG. 3 is that the signals necessary to prioritize each input signal do not depend on first prioritizing any other input signal. Each input signal can be prioritized using the subset signals, independently of the prioritizing of other input signals. In other words, each input signal's respective priority signal can be provided independently of any other input signal's priority signal. As used here, the term "independently" means that an input signal's priority signal can be provided without first obtaining any other input signal's priority signal. This promotes speed by avoiding delay that might result from first prioritizing one or more other input signals before prioritizing a given input signal.

Figure 4:
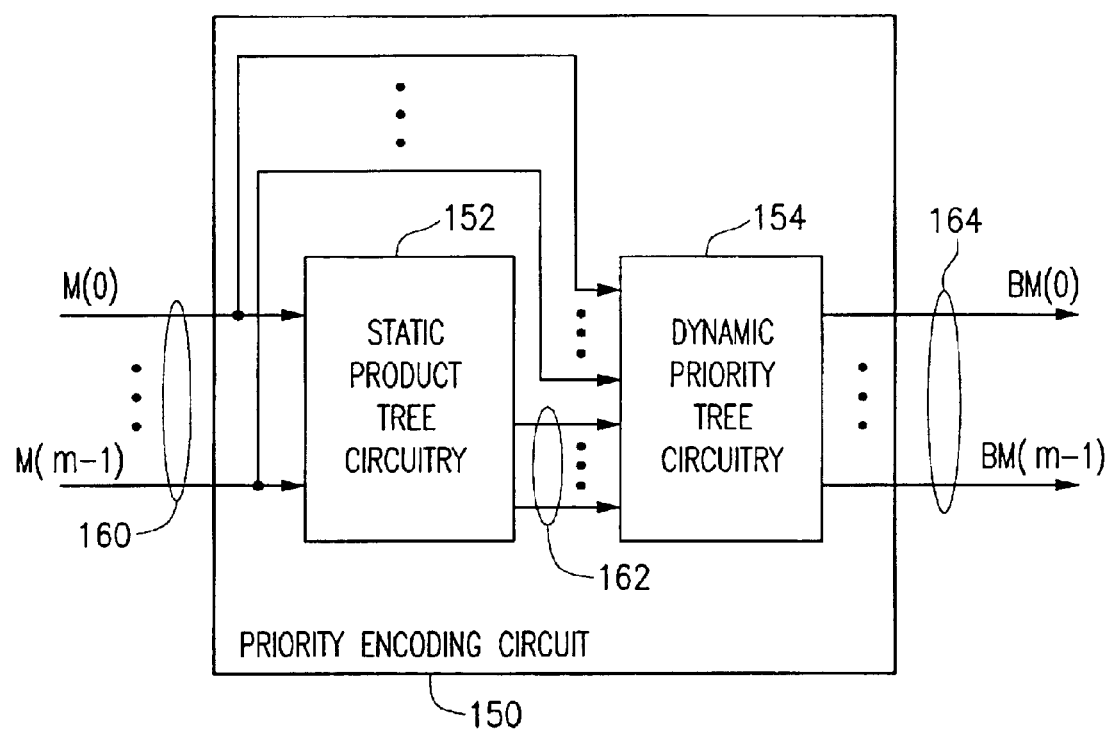
FIG. 4 is a schematic block diagram showing components of circuitry that can perform priority encoding as in FIG. 3.

Priority encoding circuit 150 in FIG. 4 can be implemented to perform the technique illustrated in FIG. 3. The signals in FIG. 4 can be examples of those shown in FIG. 3, as explained below.

Circuit 150 includes circuitry 152, illustratively a "product tree" with static logic, and circuitry 154, illustratively a "priority tree" with dynamic logic. Each of circuitry 152 and 154 is "tree-like circuitry", meaning that it is hierarchical, with the number of devices at a lower level greater than at a higher level, and with each device at a lower level connecting to a higher level.

Product tree circuitry 152 receives input signals M(0) through M(M−1) on input lines 160, and the input signals can be examples of input signals 100 in FIG. 3. In response to the input signals, circuitry 152 provides subset signals 162, which can be examples of power-of-two subset signals 102 through 104 in FIG. 3. Priority tree circuitry 154 receives both the input signals from input lines 160 and subset signals 162 and, in response, provides priority signals BM(0) through BM(M−1) on output lines 164. The priority signals on output lines 164 can be examples of priority signals 120 in FIG. 3. As in FIG. 3, each priority signal indicates whether a respective input signal is asserted and has priority, and at most one of the priority signals is asserted at a time.

Figure 5:
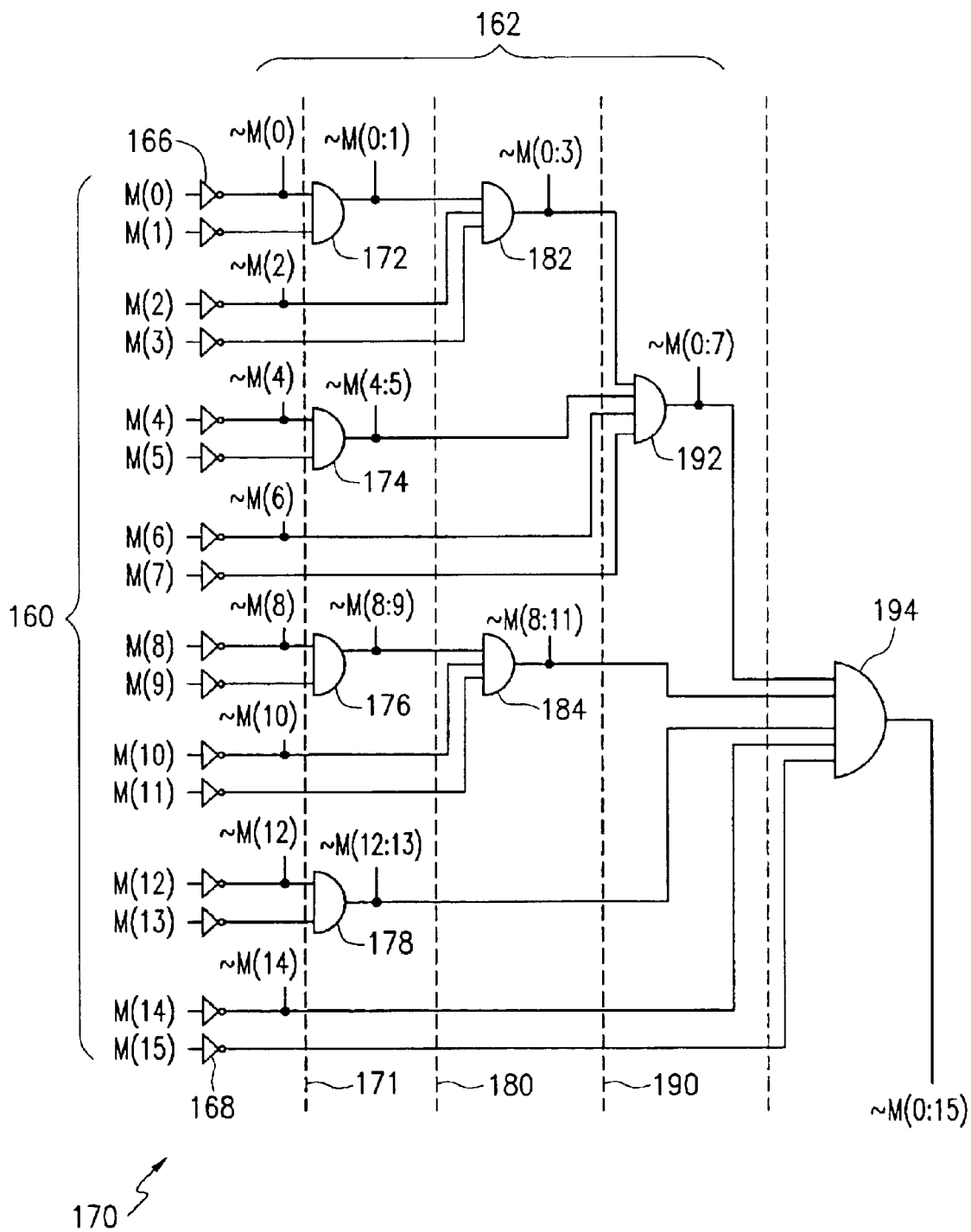
FIG. 5 is a schematic circuit diagram of an exemplary embodiment implementing the static product tree of FIG. 4.

FIG. 5 shows circuit 170, an exemplary embodiment implementing static product tree circuitry 152 in FIG. 4 for sixteen input lines 160 designated, from first to last priority, M(0) through M(15). Inverters 166 through 168 invert the signals on input lines 160, so that a high output from an AND gate in circuit 170 indicates that none of the input signals received by the AND gate is asserted. In other words, signal ~M(0:1) from AND gate 172 is high when input lines 0 and 1 are both off, signal ~M(2:3) from AND gate 174 is high when input lines 2 and 3 are both off, and so forth. Inverting match signals provides greater efficiency if circuit 170 is implemented with static NAND and NOR gates, as described in greater detail below.

As indicated at the top of FIG. 5, circuit 170 provides power-of-two subset signals 162. More specifically, eight of inverters 166 through 168 provide eight one-line signals ~M(0), ~M(2), ~M(4), ~M(6), ~M(8), ~M(10), ~M(12), and ~M(14); AND gates 172, 174, 176, and 178 provide four two-line signals ~M(0:1), ~M(4:5), ~M(8:9), and ~M(12:13), respectively; AND gates 182 and 184 provide two four-line signals ~M(0:3) and ~M(8:11), respectively; and AND gate 192 provides one eight-line signal ~M(0:7). Additional power-of-two subset signals could, of course, be produced, but these fifteen power-of-two subset signals are sufficient to prioritize the signals on input lines 160, as described below in relation to FIG. 6. Also, subset signals for subsets of other sizes could be obtained, such as powers of 3, 4, etc., although power-of-two subsets can be very efficiently implemented.

FIG. 5 also shows divisions between hierarchical levels of circuit 170. The lowest level of circuit 170 includes inverters 116 through 168. Dashed line 171 is between the lowest level and the next level, which includes AND gates 172, 174, 176, and 178. Dashed line 180 is between that level and the next level, which includes AND gates 182 and 184. Dashed line 190 is between that level and the highest level, which includes AND gate 192. Also shown is AND gate 194, which provides an overall match line signal ~M(1:15) indicating whether any of the input signals is asserted; as used herein, an "overall signal" is a signal that indicates, for all match signals or other input signals received by priority encoding circuitry, whether at least one is asserted. An additional AND gate (not shown) could be added below AND gate 194 to combine ~M(8:11), ~M(12:13), ~M(14), and ~M(15), providing its output to AND gate 194 and thereby allowing circuit 170 to be implemented entirely with AND gates having four or fewer inputs.

Circuit 170 could be implemented in various ways within the scope of the invention, with static or dynamic logic. For example, in a static logic implementation: Four lower level NAND gates could respectively receive inverted inputs numbered 0 and 1, 4 and 5, 8 and 9, and 12 and 13. Four first level inverters could each receive from one of the lower level NAND gates, to provide outputs equivalent to AND gates 172, 174, 176, and 178. Four second level inverters could respectively receive inverted inputs numbered 2, 3, 10, and 11. Two second level NOR gates could receive from the lower level, one from the NAND gate for 0 and 1 and the inverters for 2 and 3 and the other from the NAND gate for 8 and 9 and the inverters for 10 and 11, to provide outputs equivalent to AND gates 182 and 184. Four second level inverters could each receive from one of the lower level NAND gates. A first third level NAND gate could receive from the second level NOR gate for 0 through 3, the second level inverter for 4 and 5, and the inverted inputs for 6 and 7. A third level inverter could receive from the first third level NAND gate to provide an output equivalent to AND gate 192. A second third level NAND gate could receive from the second level NOR gate for 8 through 11 and the second level inverter for 12 and 13 as well as the inverted inputs for 14 and 15. And a final NOR gate could receive from the third level NAND gates to provide an output equivalent to that from AND gate 194.

The static logic implementation described above obtains some power-of-two subset signals besides those illustrated in FIG. 5. For example, the second third level NAND gate provides M(8:15), which is a power-of-two subset signal but is not separately obtained in FIG. 5 because it is not necessary for the implementation of FIG. 6.

Figure 6:
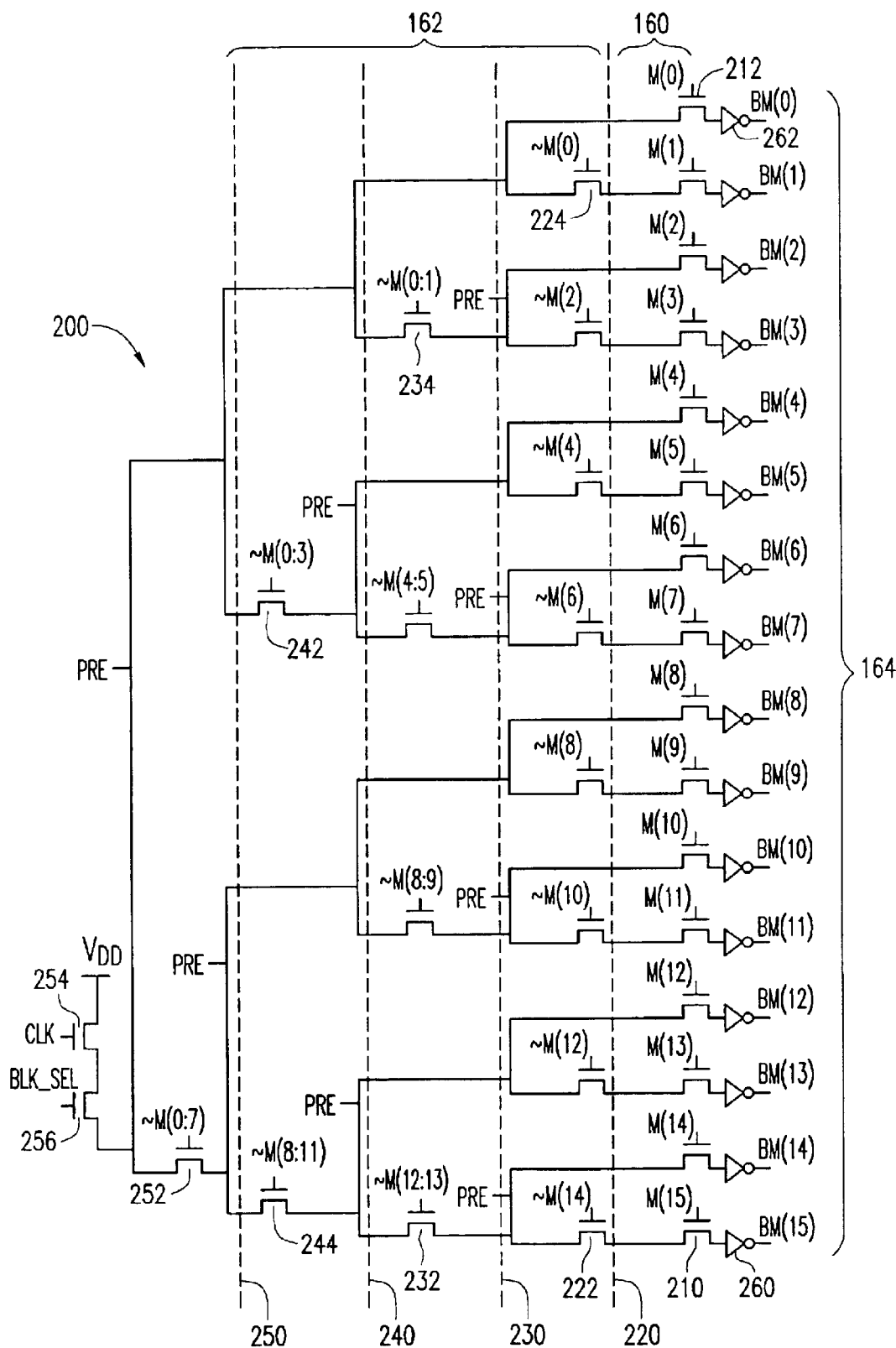
FIG. 6 is a schematic circuit diagram of an exemplary embodiment implementing the dynamic priority tree of FIG. 4.

FIG. 6 shows circuit 200, an exemplary embodiment implementing dynamic priority circuitry 154 in FIG. 4 that can be used with circuit 170 in FIG. 5. Circuit 200 responds to the sixteen match signals M(0) through M(15) on input lines 160 as well as to subset signals 162 from circuit 170. On output lines 164, circuit 200 provides best match signals BM(0) through BM(15), each of which is a priority signal indicating whether a respective match signal is asserted and has priority. At most one of BM(0) through BM(15) is asserted at a time.

Circuit 200 receives four levels of power-of-two subset signals from circuit 170. The first level includes eight inverted match signals, which can be received from eight of inverters 166 through 168 in FIG. 5. The second, third, and fourth level power-of-two subset signals include four two-line signals from AND gates 172, 174, 176, and 178; two four-line signals from AND gates 182 and 184; and one eight-line signal from AND gate 192, as described above. For each best match signal BM(0) through BM(15), circuit 200 includes switching elements, specifically pull down transistors, connected in series to control the best match signal.

The transistors in circuit 200 are shown in levels. At the first level, each best match signal from BM(0) through BM(15) has one of transistors 210 through 212 in series with its output line, with the ith best match signal controlled by the input signal M(i) from the respective input line. Dashed line 220 separates the first and second levels.

At the second level, every other best match signal from BM(1) through BM(15) similarly has one of transistors 222 through 224 in series with its output line, controlled by a one-line signal that is the inverted input signal from the next lower input line. In other words, a transistor in series with the ith output line is controlled by ~M(i−1), received from one of inverters 166 through 168 in FIG. 5. For example, at the first and second levels, BM(15) is controlled by M(15) and ~M(14), as illustrated by transistors 210 and 222, respectively. Dashed line 230 separates the second and third levels.

At the third level, every other pair of best match signal from BM(2) and BM(3) through BM(14) and BM(15) has one of transistors 232 through 234 in series with their output lines, controlled by a respective two-line signal from circuit 170. In other words, for j=1 through 4, a transistor in series with (4$_j$)th and (4$_j$−1)th output lines is controlled by a jth two-line signal. Dashed line 240 separates the third and fourth levels.

At the fourth level, two quartets of best match signals, BM(4) through BM(7) and BM(12) through BM(15), have transistors 242 and 244 in series with their output lines, respectively, controlled by four-line signals ~M(0:3) and ~M(8:11) from circuit 170. In other words, for k=1 through 2, a transistor in series with (8k)th through (8k−3)th output lines is controlled by a kth four-line signal. Dashed line 250 separates the fourth and fifth levels.

At the fifth level, an octet of best match signals, BM(8) through BM(15), has transistor 252 in series with their output lines, controlled by eight-line signal ~M(0:7) from circuit 170.

Above the fifth level, circuit 200 also includes transistor 254, with its gate receiving a global clock signal clk, and transistor 256, with its gate receiving a block select signal Blk_sel as discussed in greater detail below in relation to FIG. 7. Transistors 254 and 256 are connected in series between a suitable voltage source $V_{DD}$ and the fifth level of circuit 200. Transistor 254 prevents power drain. Downstream gates with dynamic inputs from circuit 200 do not need a device like transistor 254 to prevent power drain during precharge.

To reduce its area and maintain speed, circuit 200 can be implemented with dynamic logic that includes NMOS transistors. Several features of circuit 200 are specific to implementation with dynamic logic. For example, the final dynamic nodes, between transistors 210 through 212 and inverters 260 through 262 respectively, can be precharged to $V_{DD}$ with PMOS devices (not shown), and the best match signals BM(0) through BM(15) can be driven out through inverters 260 through 262 to preserve state. Also, to prevent charge sharing with transistors 210 through 212, each internal node of circuit 200 that receives a subset signal from circuit 170 (FIG. 5) can be precharged by a precharge signal (pre) to ($V_{DD}$−$V_t$), where $V_t$ is NMOS transistor threshold voltage. FIG. 6 shows pre provided to several nodes, and pre can be provided by a small area NMOS device (not shown) that is gated by the inverse of clk. In general, nodes can be precharged as necessary to prevent charge sharing due to subset signals that are not available until late in the precharge phase. Precharge can occur during the half clock cycle following match line evaluation, while static logic in circuit 170 is evaluating. Dynamic logic in circuit 200 then evaluates when clk goes high during the next half clock cycle.

The exemplary embodiment of FIGS. 4–6 therefore includes M input lines and M output lines, where M is an integer power of 2, illustratively sixteen or $2^4$. Circuit 152, which can be implemented by circuit 170, responds to the M input signals, providing subset signals, each indicating whether any of a respective subset of the input signals is asserted. Taking $M=2^N$, the subsets include, for n=0 to (N−1), $2^{N-(n+1)}$ subsets of $2^N$ input lines, i.e. where N=4, eight subsets of one line, four subsets of two lines, two subsets of four lines, and one subset of eight lines. Circuit 154, which can be implemented by circuit 200, responds to the M input signals and the subset signals, providing the priority signals. Each of the priority signals depends on no more than $\log_2 M = N$ subset signals or, where M=16, four of the subset signals.

Figure 1:
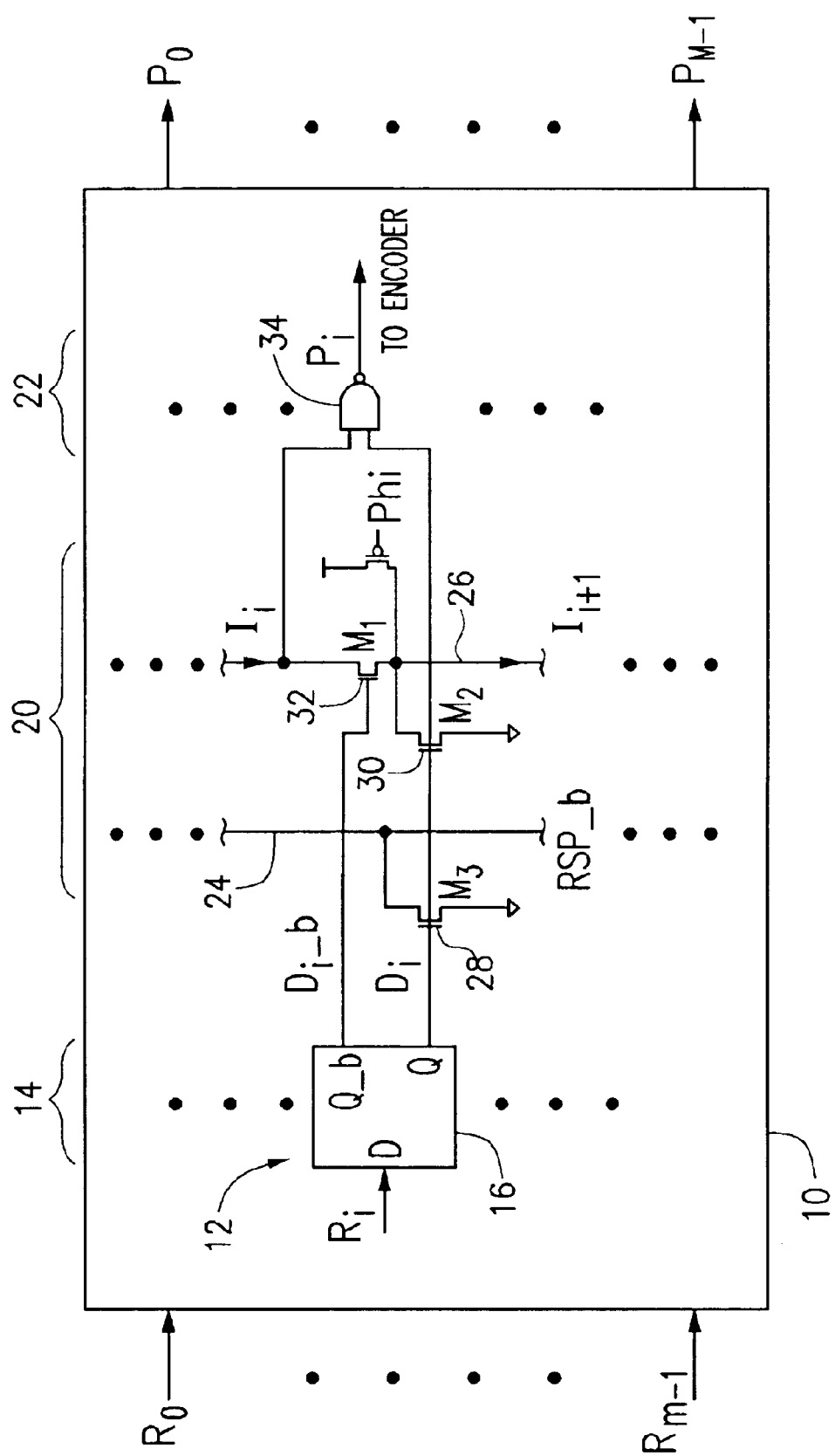
FIG. 1 is a schematic circuit diagram of a previously proposed priority encoder system.

In comparison with the previous ripple chain proposal illustrated in FIG. 1, the exemplary embodiment of FIGS. 4–6 is faster, smaller, and more power efficient. It is faster because a dynamic tree is much faster than a ripple chain; for 16 entries, a dynamic tree could have a maximum of seven transistors in series while a ripple chain would have 16. It is smaller because it requires fewer transistors; for 16 entries, the ripple chain would require 13 transistors per entry if all inverters and keepers are counted, while FIGS. 4–6 could be implemented with 11.5 per entry. (Even fewer transistors might be required if circuit 170 were instead implemented with dynamic logic, but this would introduce complex timing requirements.) The embodiment of FIGS. 4–6 is more power efficient because it prevents power drain during precharge; to prevent power drain in system 10 in FIG. 1, additional transistors could be added for each input line or $D_i$ could be held low, which might also require more transistors, but adding more transistors consumes more area.

Figure 7:
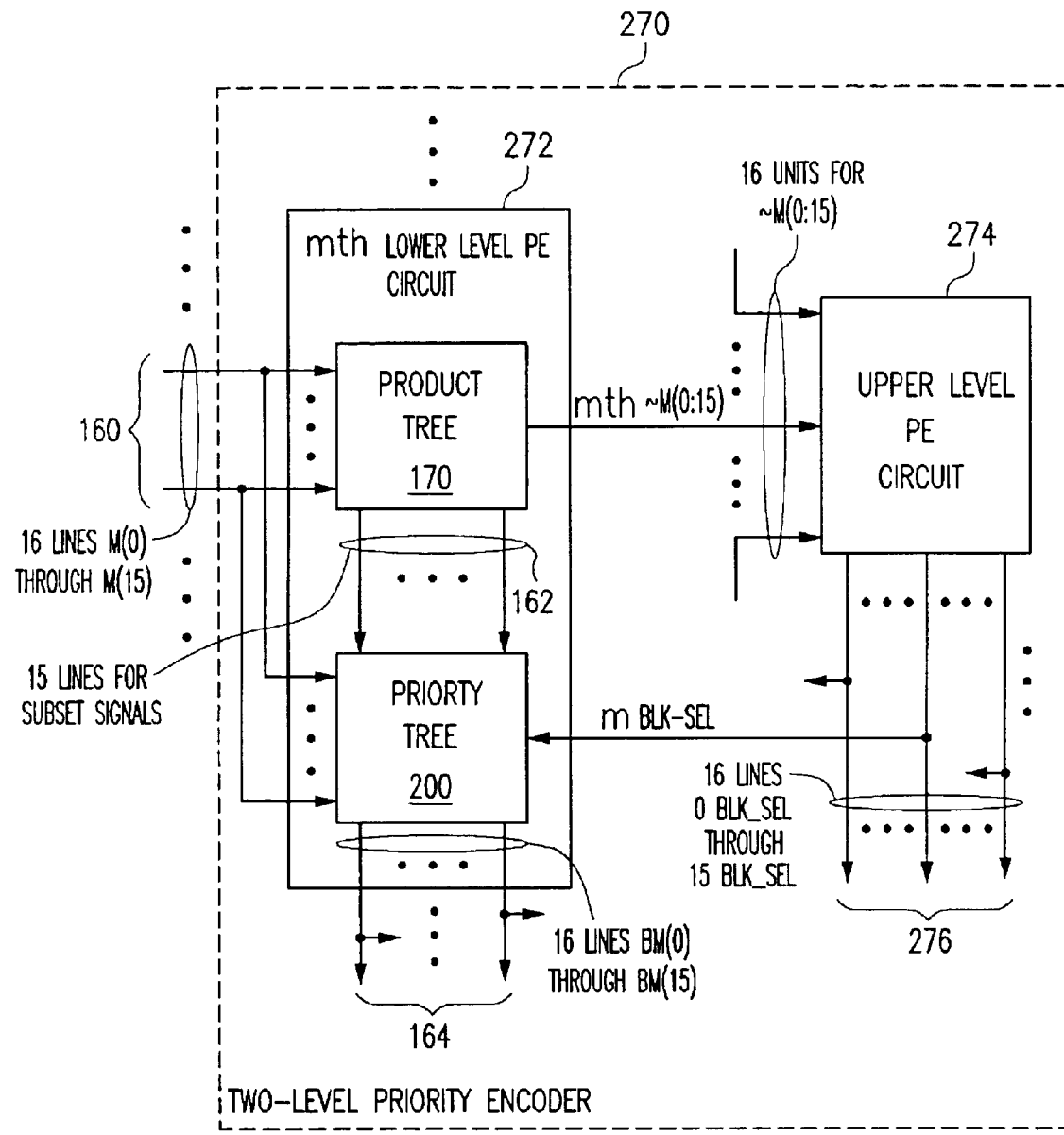
FIG. 7 is a schematic circuit diagram of a two-level priority encoder that includes circuitry as in FIGS. 4–6.

FIG. 7 shows 256-entry two-level priority encoder 270. At its lower level, priority encoder 270 includes 16 priority encoding circuits, each for 16 lines, as exemplified by nth priority encoding circuitry 272. At its upper level, priority encoder 270 includes 16-line priority encoding circuit 274.

Each of the lower level priority encoding circuits can be implemented like circuit 150 in FIG. 4, with sixteen input lines 160 for input signals ~M(0) through ~M(15), fifteen lines 162 for power-of-two subset signals, and sixteen output lines 164 for providing respective priority signals BM(0) through BM(15) to other components as described below in relation to FIG. 8. As shown, nth lower level priority encoding circuitry 272 includes product tree circuit 170 as in FIG. 5 and priority tree circuit 200 as in FIG. 6, with circuit 170 providing, in addition to other subset signals, the signal ~M(0:15) from AND gate 194 as the nth of sixteen input signals to upper level priority encoding circuit 274. Circuit 200 receives nth block select signal nBlk_sel from circuit 274, which controls whether circuit 200 performs dynamic prioritization as described above. When performing prioritization, circuit 200 provides lower level priority signals BM(0) through BM(15) on its output lines 164, each indicating whether a respective one of M(0) through M(15) is asserted and has priority. At most one of BM(0) through BM(15) is asserted at a time.

Circuit 274 can be implemented as a conventional 16 entry priority encoder with static gates to generate a one-of-16 Blk_sel signal that is provided on upper output lines 276, selecting priority tree 200 of one of the lower level priority circuits to perform dynamic prioritization. Each bit of the Blk_sel signal from circuit 274 indicates whether the match signal ~M(0:15) from a respective lower level priority encoder is asserted and has priority, and at most one of the Blk_sel bits is asserted at a time. The Blk_sel signal is also provided to other components as described below in relation to FIG. 8.

Figure 8:
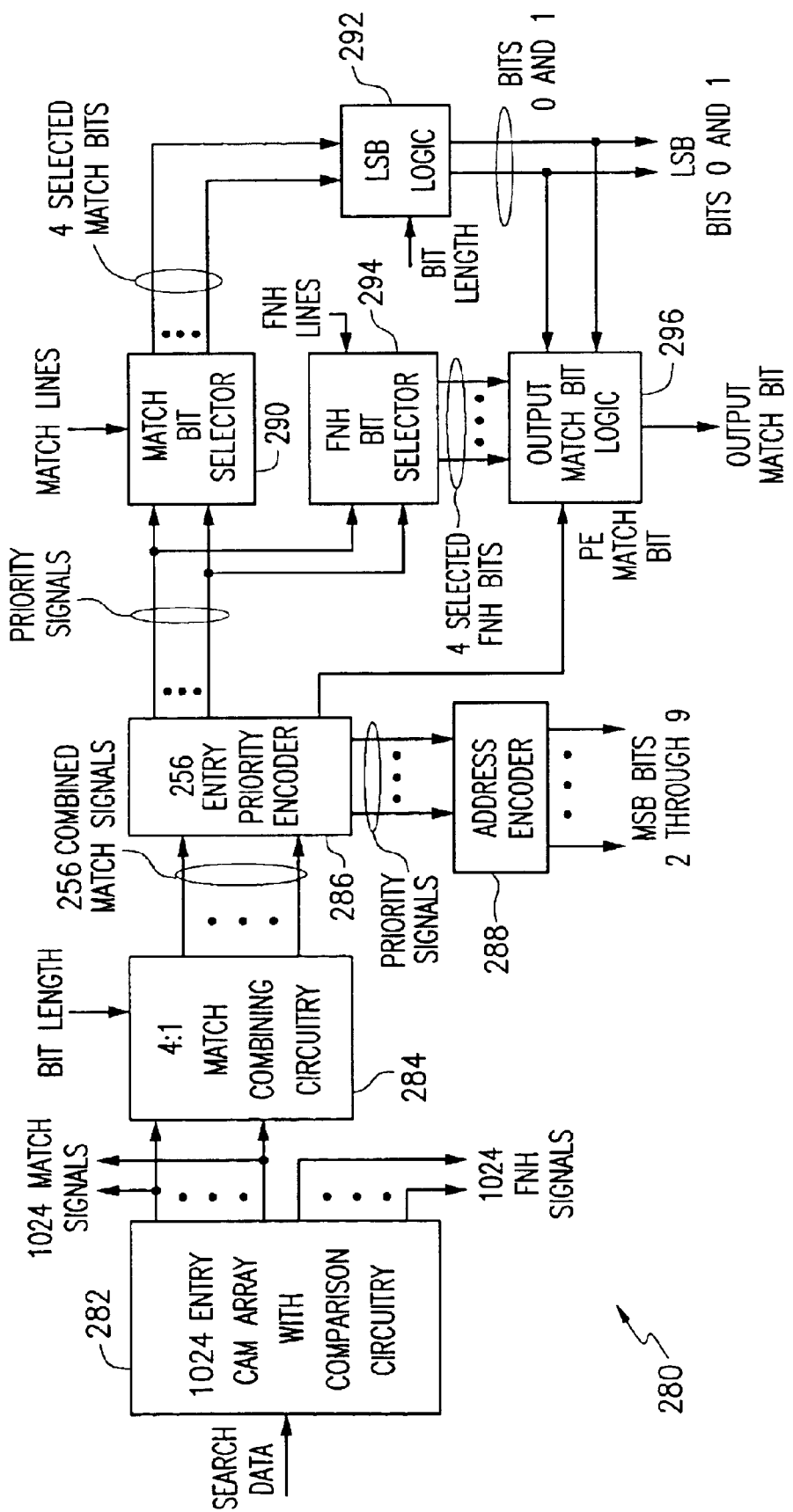
FIG. 8 is a schematic circuit diagram of a CAM circuit that includes a two-level priority encoder that can be implemented as in FIG. 7.

FIG. 8 shows CAM circuitry 280, which includes 1024-entry CAM array 282, 4:1 match combining circuitry 284, 256-entry priority encoder 286, address encoding circuitry 288, match bit selector 290, least significant bit (LSB) logic 292, force no hit (FNH) bit selector 294, and match bit logic 296. Regarding FNH bit selector 294, an FNH bit is an example of a single bit suppress signal indicating that an asserted match signal should be suppressed, ignored, or otherwise prevented from affecting some or all search results. Suppress signals are often based on stored suppress values such as status bits or flags of locations in a CAM array. Specifically, a location's FNH bit, when asserted, indicates that a match signal from the location should be ignored; if a location's match signal and FNH bit are both asserted and the location has priority, none of the output lines should be asserted, thus indicating that there is no best match.

CAM array 282 stores 1024 multiple-bit (e.g. 80-bit, 160-bit, or 320-bit) entries in respective locations and includes comparison circuitry that responds to a search data item and a stored entry, indicating whether the stored entry satisfies a matching criterion indicated by the search data item. In response to a search data item, CAM array 282 provides, for each location, a match signal indicating whether its stored entry satisfies the matching criterion. Other components of CAM circuitry 280 respond to the match signals.

Match combining circuitry 284 responds to the match signals from CAM array 282 and to a bit length signal indicating, e.g., 80, 160, or 320 bits as the search width if each entry in CAM array 282 is 80 bits. In response, circuitry 284 provides combined match signals on 256 lines to priority encoder 286.

Figure 9:
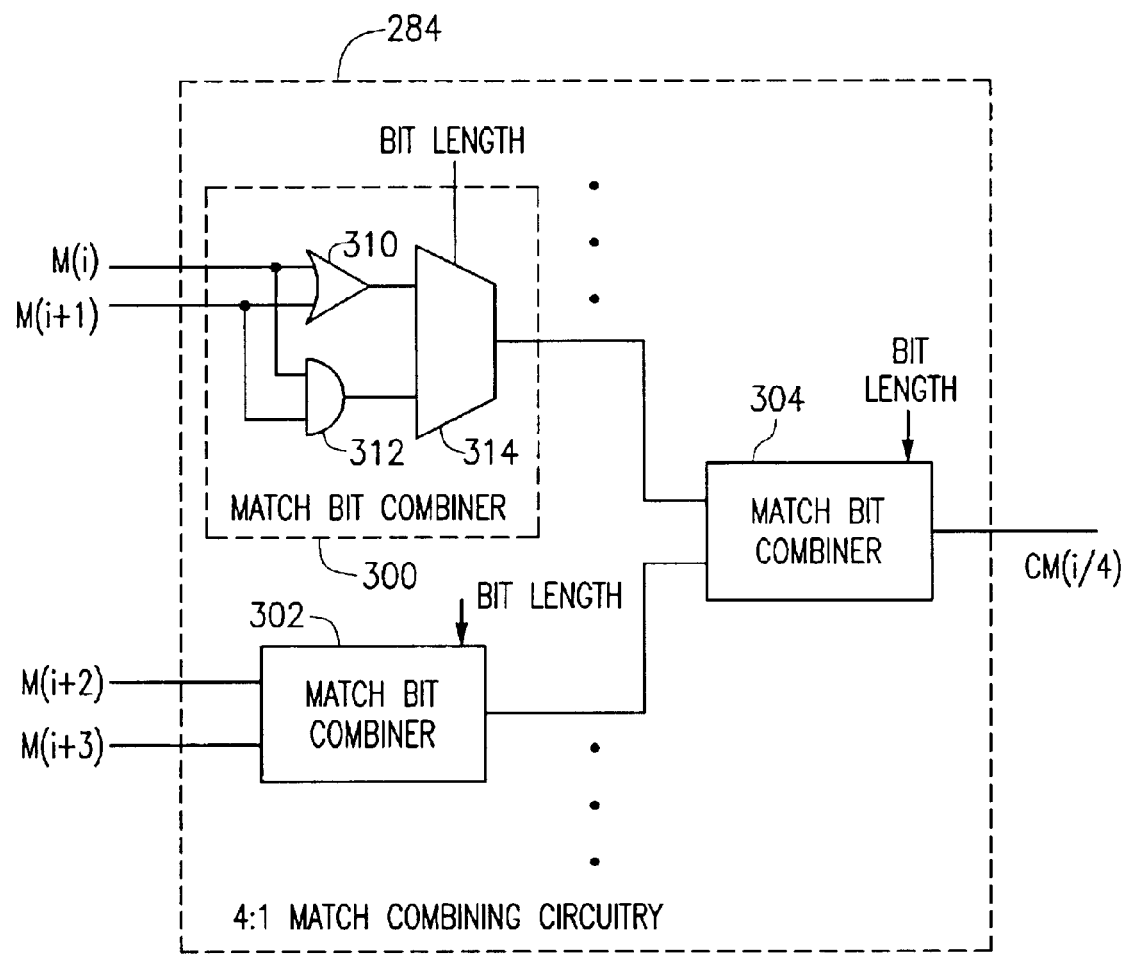
FIG. 9 is a schematic circuit diagram showing details of an exemplary embodiment implementing match combining circuitry 284 in FIG. 8.

FIG. 9 illustrates an exemplary embodiment of circuitry 284. For four consecutive lines, illustratively M(i) through M(i+3) where i is a non-negative multiple of 4, match bit combiner 300 combines match signals M(i) and M(i+1), match bit combiner 302 combines match signals M(i+2) and M(i+3), and match bit combiner 304 combines the results from combiners 300 and 302 to provide combined match signal CM(i/4).

Each of combiners 300, 302, and 304 can be implemented with standard CMOS static AND and OR gates as shown in greater detail in combiner 300, or with equivalent static NOR and NAND gates with appropriate inversions. The inputs to each combiner are received in parallel by OR gate 310 and AND gate 312, and one of the results from gates 310 and 312 is selected for output as CM(i/4) by multiplexer 314 based on the bit length signal. If the bit length signal indicates 80 bits, the output from OR gate 310 is selected in all three combiners; if 160 bits, the output from AND gate 312 is selected in combiners 300 and 302 and the output from OR gate 310 is selected in combiner 304; if 320 bits, the output from AND gate 312 is selected in all three combiners.

Match combining circuitry 284 performs 4:1 combining, but could easily be modified to perform 8:1 combining, such as to support a search width of 640 bits, or to perform combining at any other appropriate ratio.

Priority encoder 286 responds to CM(0) through CM(255) from match combining circuitry 284, providing respective priority signals which could be one-of-256 signals. Priority encoder 286 can, however, be an implementation of two-level priority encoder 270 in FIG. 7. If so, the respective priority signal for each set of 16 combined match signals includes best match signals BM(0) through BM(15) from the set's priority tree 200, for a total of 256 best match signals, and the set's corresponding Blk_sel signal from upper level priority encoding circuit 274.

Address encoding circuitry 288 responds to priority signals from priority encoder 286, providing the eight most significant bits (MSBs) of an output address code. The eight MSBs from circuitry 288 indicate a set of four locations in CAM array 282 for which at least one match signal indicates that a stored entry satisfies the matching criterion.

Circuitry 288 can be implemented with conventional components. Priority signals 122 can include one upper 16-bit priority signal and one lower 256-bit priority signal, each with at most one asserted bit as described above. The lower 256-bit priority signal can in turn include sixteen 16-bit lower level priority signals, each including BM(0) through BM(15) from one of the lower level priority encoder circuits. In this case, circuitry 288 can include one upper address encoder to convert the upper 16-bit priority signal to address code bits 6 to 9 and sixteen lower address encoders, each to convert one of the 16-bit lower level priority signals to four bits. The four bits from the sixteen lower address encoders can all be ORed with four 16-input dynamic OR gates to obtain address code bits 2 to 5.

In comparison with one address encoder for a 256-bit priority signal, it is much more efficient to use sixteen address encoders, each for a 16-bit priority signal. The number of address encoding transistors required for a 256-bit encoder is approximately half the product of the number of input lines times the number of output lines divided by 2 (because only half the input-output line pairs have transistors), or 256×8/2=1024. The number of transistors for one upper 16-bit encoder and sixteen 16-bit lower encoders is similarly 17×16×4/2=544, a little more than half as many as for a 256-bit encoder, resulting in a significant saving in layout area and power. 64 additional transistors would be required to OR the outputs of the 16-bit encoders, and some other transistors would be required to complete the circuitry, but the total would still be considerably less than for a 256-bit encoder.

Match bit selector 290 also responds to priority signals from priority encoder 286, selecting and providing the match signals for the set of four locations in CAM array 282 indicated by the priority signals. LSB logic 292 responds to the selected match signals and the bit length, providing the two LSBs of the output address code.

Figure 10:
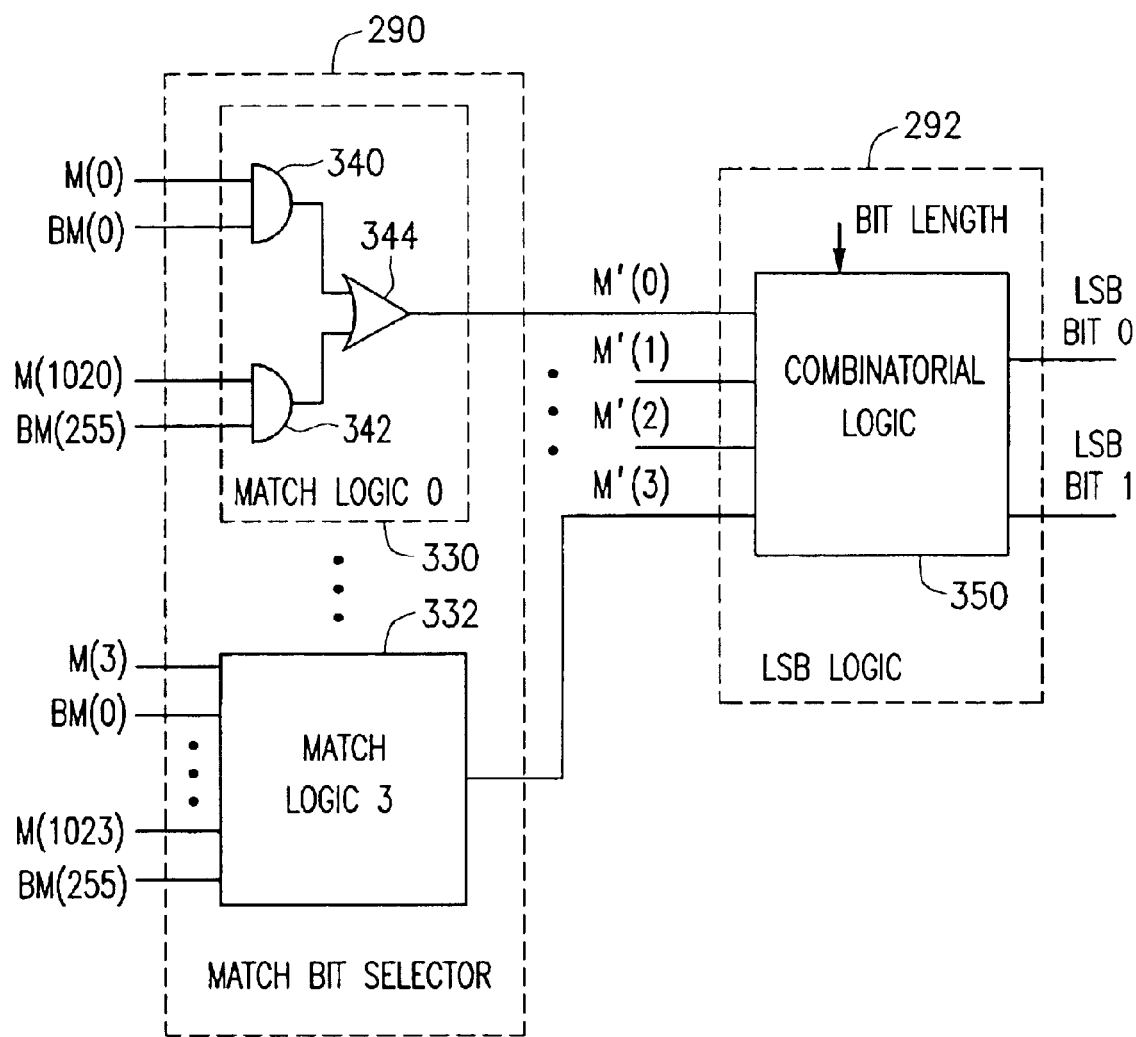
FIG. 10 is a schematic circuit diagram showing details of an exemplary embodiment implementing match bit selector 290 and least significant bit (LSB) logic 292 in FIG. 8.

FIG. 10 illustrates an exemplary embodiment implementing match bit selector 290 and LSB logic 292.

Match bit selector 290 can include four logic components, 0-bit match logic 330 through 3-bit match logic 332. Each match logic component can be implemented as shown in detail in match logic 330, illustratively shown with area-inefficient static gates but which can be implemented with dynamic logic as described below in relation to FIG. 12 for area efficiency. Match logic 330 includes 256 AND gates 340 through 342, and, for k=0 to 255, each AND gate in the Qth match logic responds to every fourth respective match signal M(4k+Q) and priority signal BM(k). The results from AND gates 340 through 342 are provided to OR gate 344, which provides the respective selected match signals M'(0), M'(1), M'(2), and M'(3) to LBS logic 292. Since at most one BM(k) is asserted at a time, at most one match signal will be selected by each match logic component and provided to LSB logic 292. If priority encoder 286 is implemented as described in relation to FIG. 7, BM(0) through BM(255) can be received from the priority trees 200 of all the lower level PE circuits 272, but with all BM(k) values low except those of the circuit 272 selected by 0Blk_sel through 15Blk_sel.

Components of match logic 330 could be implemented in various ways. For example, OR gate 344 could be implemented with a two level OR gate, in which a first stage combines 16 entries. This would speed up the readout process considerably but would impose some area penalty over a single OR gate. A sense-amp based design could also be implemented.

LSB logic 292 can include conventional combinatorial logic 350 to provide LSB bits 0 and 1, the LSBs of the address code. Combinatorial logic 350 can, for example, always provide "00" if the bit length is 320, regardless of the values of M'(0) through M'(3). If the bit length is 160, LSB circuitry 292 can provide "00" or "10", depending on which of the 160 bit entries matches on both its 80 bit parts or, if both match, LSB circuitry 292 can treat one 160 bit entry as having priority depending on a desired ordering of priority. If the bit length is 80, LSB circuitry 292 can provide "00", "01, "10", or "11", depending on which of the 80 bit entries matches or, if more than one match, LSB circuitry 292 can treat one of the matching 80 bit entries as having priority depending on a desired ordering of priority.

Force no hit (FNH) bit selector 294 also responds to priority signals from priority encoder 286, selecting and providing the FNH signals for the set of four locations in CAM array 282 indicated by the priority signals. In CAM arrays, a location's FNH bit, when asserted, indicates that a match signal from the location should be ignored; if a location's match signal and FNH bit are both asserted and the location has priority, none of the output lines should be asserted, thus indicating that there is no best match.

Output match bit logic 296 provides an output match bit in response to several other signals, including LSB bits 0 and 1 from LSB logic 292, the selected FNH signals from FNH bit selector 294, and an overall match bit from priority encoder 286.

Figure 11:
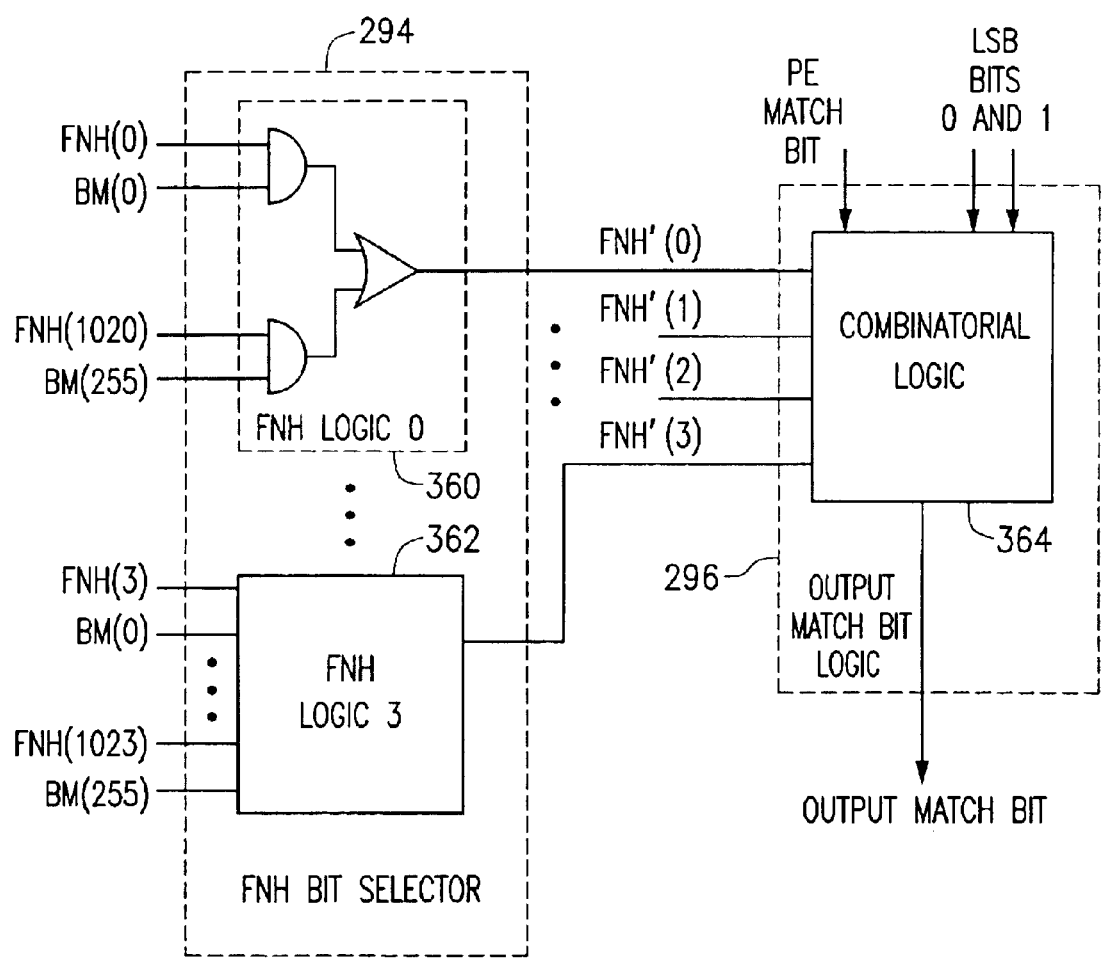
FIG. 11 is a schematic circuit diagram showing details of an exemplary embodiment implementing force no hit (FNH) bit selector 294 and output match bit logic 296 in FIG. 8.

FIG. 11 illustrates an exemplary embodiment implementing FNH bit selector 294 and output match bit logic 296.

Like match bit selector 290, FNH bit selector 294 can include four logic components, 0-bit FNH logic 360 through 3-bit FNH logic 362. As shown by FNH logic 360, each FNH logic component can be implemented as shown in detail in match logic 330 in FIG. 10, described above. At its output, FNH bit selector 294 provides the respective selected FNH signals FNH'(0), FNH'(1), FNH'(2), and FNH' (3) to output match bit logic 296.

Output match bit logic 296 can include conventional combinatorial logic 364 to provide the output match bit. Combinatorial logic 364 can, for example, provide an off or not asserted output whenever the overall match bit from priority encoder 286 is off. If the overall match bit is on, combinatorial logic 364 can provide an on or asserted output match bit only when the FNH bit for the entry indicated by LSB bits 0 and 1 is not asserted.

In the implementation of combinatorial logic 364 described above, each location's FNH bit, when asserted, indicates that a match signal from the location should be ignored; if a location's match signal and FNH bit are both asserted and the location has priority, none of the output lines should be asserted, thus indicating that there is no best match. Combinatorial logic 364 could be implemented for other interpretations of an FNH bit or for other types of suppress signals with different effects.

Figure 12:
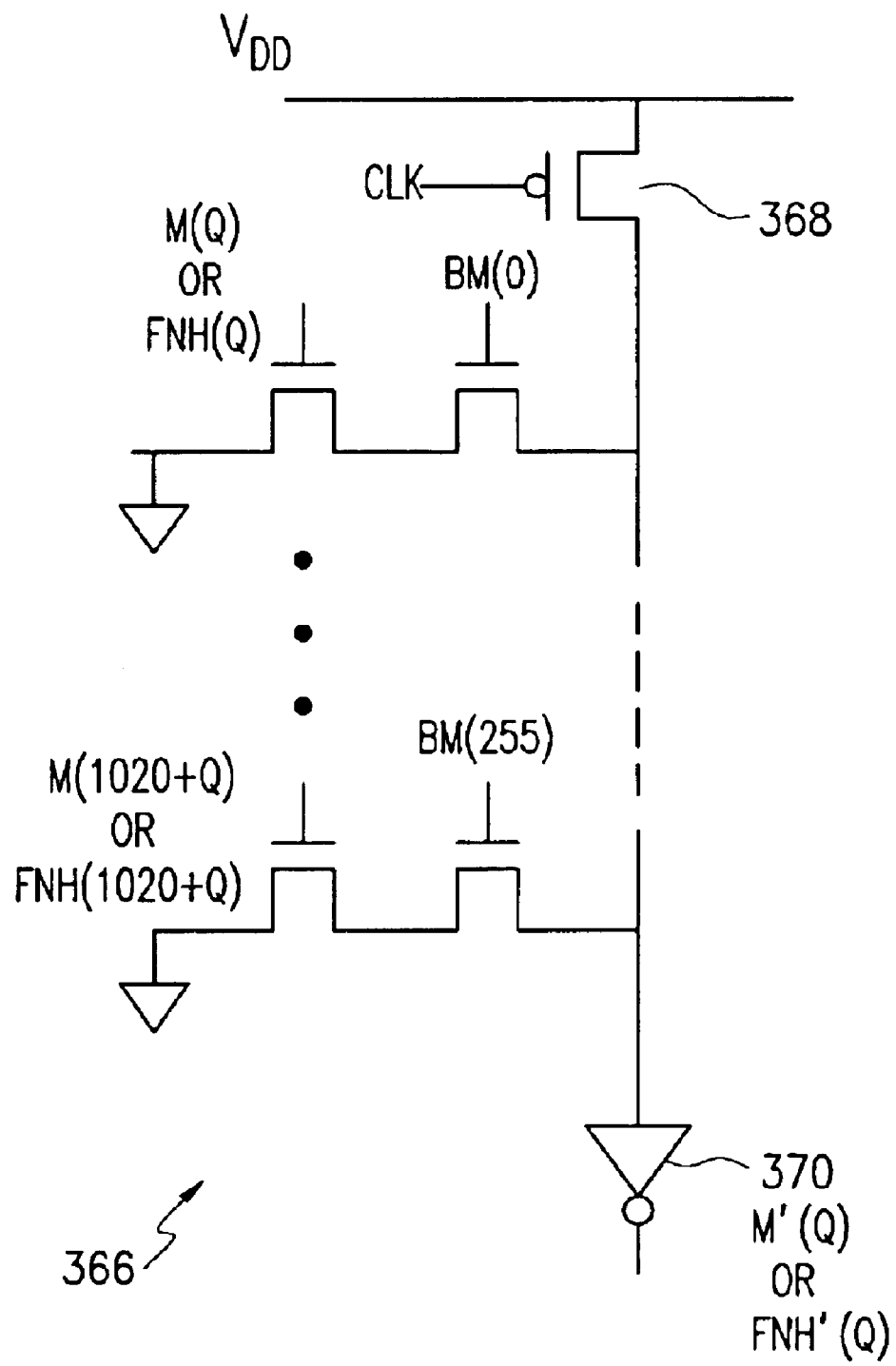
FIG. 12 is a schematic circuit diagram showing an exemplary embodiment implementing dynamic logic that can be used in the circuits of FIGS. 10 and 11.

FIG. 12 shows dynamic logic 366, an exemplary embodiment implementing the match logic components in match bit selector 290 or the FNH logic components in FNH bit selector 294. Dynamic logic 366 includes precharge transistor 368, which is controlled by a global clock signal clk. When transistor 368 is turned on, the input voltage to inverter 370 is precharged to $V_{DD}$, after which any of 256 pairs of transistors connected in series can pull down the input voltage to inverter 370, providing a high output signal M'(Q) or FNH'(Q), where Q has one of the values 0, 1, 2, or 3. In each pair of transistors in series, of which the first and last pair are illustratively shown, the gate of one transistor is connected to receive one of priority signals BM(0) through BM(255), and the gate of the other is connected to receive either one of every fourth of match signals M(Q) through M(1020+Q) or one of every fourth of FNH signals FNH(Q) through FNH (1020+Q).

Figure 13:
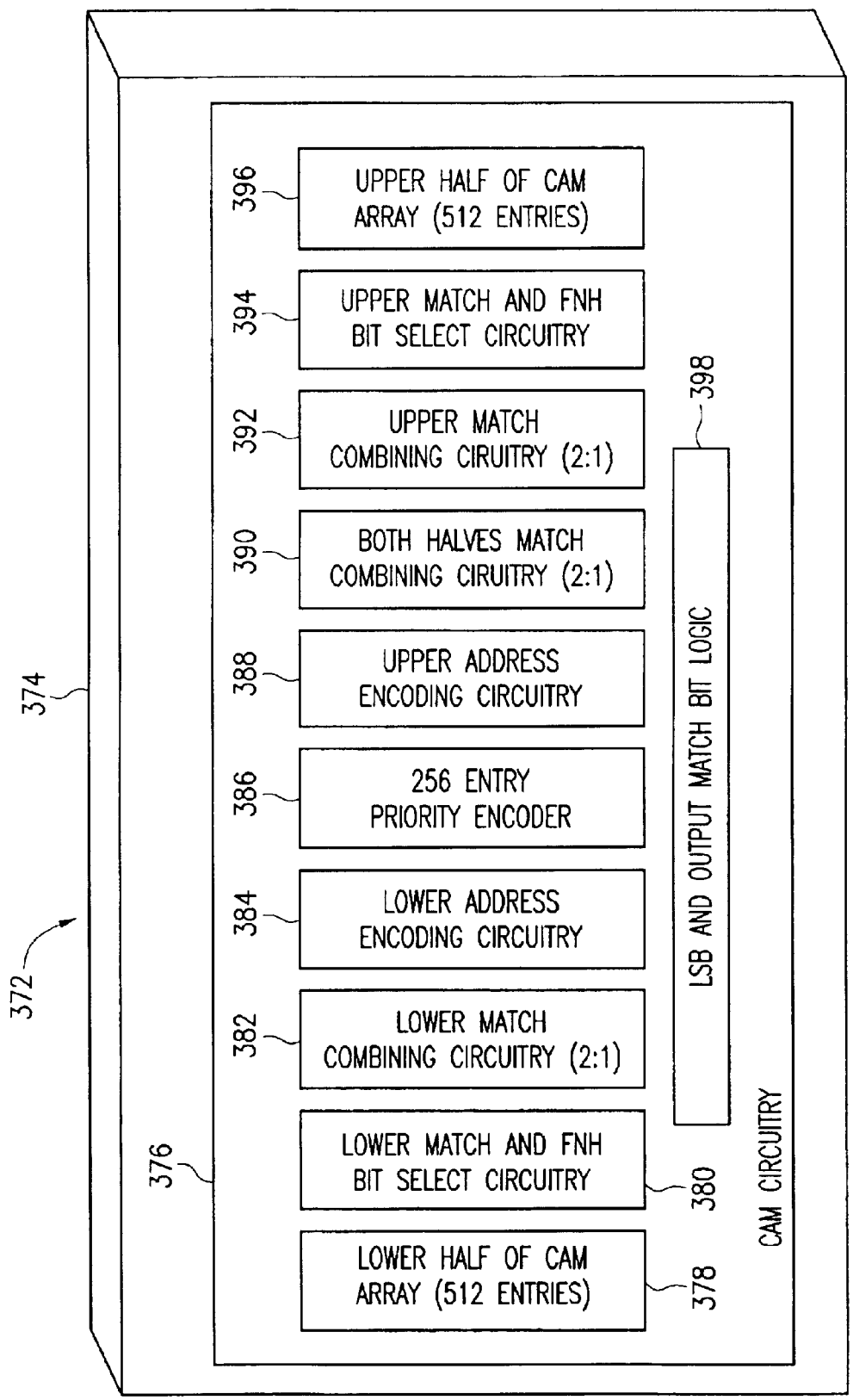
FIG. 13 is a schematic plan view of an integrated circuit with a CAM block layout that includes components as in FIG. 8.

In FIG. 13, integrated circuit (IC) 372 includes substrate 374 and one or more examples of CAM circuitry 376 (and optionally other circuitry not shown) formed at a surface of substrate 374, to obtain an area- and power-efficient CAM IC or to obtain a CPU or other application specific integrated circuit (ASIC) with CAM circuitry.

If IC 372 is a CAM IC, it can include several examples of CAM circuitry 376, referred to as CAM cores, along with circuitry to coordinate operations between them. Within the CAM cores, each CAM array would have read and write circuitry (not shown) associated with it. It would be possible, for example, to have 32 CAM cores. Each CAM core could have 4 priority encoders whose outputs are combined to find an entry in the CAM core that meets the matching criterion and has priority; a single output signal for that entry could then be provided to the coordinating circuitry for the CAM cores. Each CAM core could maintain an independent search table with an independent search width, and a search could be performed for entries matching a given search key in any or all of the CAM cores; alternatively, searches for entries matching different search keys could be performed concurrently in different cores.

In the illustrated exemplary embodiment, a CAM array is divided into two parts, which are separated from each other on the surface of substrate 374, with other circuitry components between them. CAM circuitry 376 includes lower CAM array 378, lower match and FNH bit select circuitry 380, lower match combining circuitry 382, lower address encoding circuitry 384, priority encoder 386, upper address encoding circuitry 388, both halves match combining circuitry 390, upper match combining circuitry 392, upper match and FNH bit select circuitry 394, upper CAM array 396, and LSB and output match bit logic 398. For k=0 to 255, lower CAM array 378 includes entries 4k and (4k+1), while upper CAM array 396 includes entries (4k+2) and (4k+3). The components of CAM circuitry 376 are illustratively shown as layout blocks without connections, but it will be understood that the blocks vary in size and shape and that appropriate connections are provided. The layout features shown could be provided with various combinations of layered structures.

Input and output signal connections and signal connections between blocks in CAM circuitry 376 can be understood from FIG. 8 and the above description. In addition, the arrangement of components within CAM circuitry 376 conserves metal lines by reducing the number of lines that extend between components. For example, 512 match lines and 512 FNH lines from lower CAM array 378 extend together to lower match and FNH bit select circuitry 380, and the 512 match lines alone extend further to lower half match combining circuitry 382, but need not extend further. Similarly, 512 match lines and 512 FNH lines from upper CAM array 396 need extend together only to upper match and FNH bit select circuitry 394, and the 512 match lines alone to upper half match combining circuitry 392. 256 output lines from lower half match combining circuitry 382 and 256 output lines from upper half match combining circuitry 392 must extend to both halves match combining circuitry 390. 256 combined match lines from circuitry 390 extend to priority encoder 386. With two-level priority encoding, 256 lower level priority signal lines extend from priority encoder 386 in both directions, to lower address encoding circuitry 384 and to lower match and FNH bit select circuitry 380 on one side and to upper match and FNH bit select circuitry 394 on the other. 16 upper level priority signal lines extend from priority encoder 386 to upper address encoding circuitry 388, a 16-bit priority encoder that is shown as a separate block for illustrative purposes; in the implementation of FIG. 7, however, the 16 Blk_sel signals go from upper level PE circuit 274 to priority tree 200 in each lower level PE 272, so that upper address encoding circuitry 388 can be fit between those components, within the perimeter of priority encoder 386. A small number of lines extend from other components to LSB and output match bit logic 398, and appropriate lines are also provided for output of the MSBs of the address code.

In operation, lower match combining circuitry 382 responds to match signals from lower CAM array 378 while upper match combining circuitry 392 responds to match signals from upper CAM array 396. The resulting combined match signals are provided to both halves match combining circuitry 390, which performs a further 2:1 combination.

Combined match signals from circuitry 390 are provided to priority encoder 386, which can be implemented with upper and lower level PE circuits that provide a set of 16 upper priority signals and a set of 256 lower priority signals, respectively, each set having at most one asserted bit as described above. These priority signals can be provided respectively to lower and upper address encoding circuitry 384 and 388 to obtain MSBs of address codes, as described above in relation to FIG. 8. In addition, the 256 lower priority signals from the lower level priority encoding circuits are provided to both lower and upper match and FNH bit select circuitry 380 and 394. Circuitry 380 responds to match and FNH signals from lower CAM array 378 and the priority signals, selecting match and FNH signals from lower CAM array 378 for the combined match signal indicated by the priority signals. Similarly, circuitry 394 responds to match and FNH signals from upper CAM array 396 and the priority signals, selecting match and FNH signals from upper CAM array 396 for the combined match signal indicated by the priority signals. Circuitry 380 and 394 provide the selected signals to LSB and output match bit logic 398.

LSB and output match bit logic 398 includes LSB logic as in FIG. 10 and output match bit logic as in FIG. 11. The LSB logic responds to the selected match signals from selecting circuitry 380 and 394, providing one or more least significant bits of the address code. Similarly, the output match bit logic responds to the selected FNH signals as well as the least significant bits, as described above in relation to FIG. 11.

CAM circuitry 376 could be formed with patterned layers on surface 374 using conventional photolithographic techniques. The patterned layers could include any suitable materials, deposited and patterned in any appropriate way.

Figure 14:
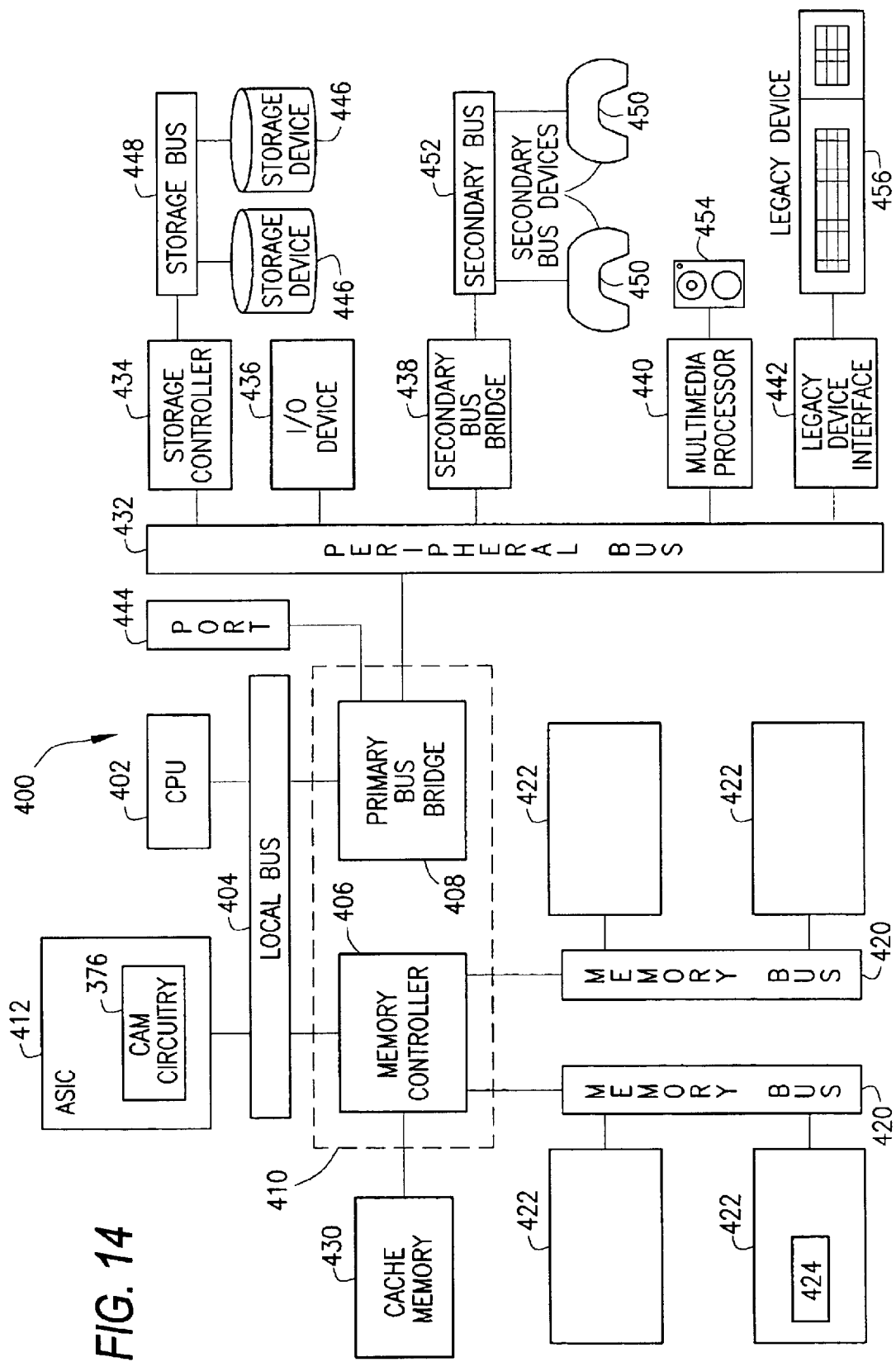
FIG. 14 is a schematic block diagram of a system that includes an integrated circuit with CAM circuitry as in FIG. 13.

FIG. 14 illustrates an exemplary processing system 400 that includes CAM circuitry 376 as shown in FIG. 13 on an application specific integrated circuit (ASIC). Processing system 400 includes one or more processors (CPUs) 402 connected to local bus 404. Memory controller 406 and primary bus bridge 408 are also connected to local bus 404. Processing system 400 may include multiple memory controllers 406 and/or multiple primary bus bridges 408. Memory controller 406 and primary bus bridge 408 may be integrated as a single device 410. ASIC 412 is also illustratively connected to local bus 404, and includes CAM circuitry 376 as in FIG. 13, embedded with other circuitry suitable to the application. ASIC 412 could, for example, be an additional CPU.

Memory controller 406 is also connected to one or more memory buses 420. Each memory bus accepts memory components 422, each of which may be a memory card or a memory module, for example. Some memory components 422 may include one or more additional devices 424. For example, in a SIMM or DIMM, additional device 424 might be a configuration memory, such as a serial presence detect (SPD) memory.

Memory controller 406 may also be connected to cache memory 430, which may be the only cache memory in processing system 400. Alternatively, other devices, such as processors 402, may also include cache memories, which may form a cache hierarchy with cache memory 430. If processing system 400 includes peripherals or controllers that are bus masters or that support direct memory access (DMA), memory controller 406 may implement a cache coherency protocol. If memory controller 406 is connected to two or more memory buses 420, each of memory buses 420 may be operated in parallel, or different address ranges may be mapped to different memory buses 420.

Primary bus bridge 408 is connected to at least one peripheral bus 432. Various devices, such as peripherals or additional bus bridges, may be connected to peripheral bus 432. These devices may include storage controller 434, miscellaneous I/O device 436, secondary bus bridge 438, multimedia processor 440, and legacy device interface 442. Primary bus bridge 408 may also be connected to one or more special purpose high speed port 444. In a personal computer, for example, special purpose high speed port 444 might be an Accelerated Graphics Port (AGP), used to connect a high performance video card to processing system 400.

Storage controller 434 connects one or more storage devices 446, accessed via storage bus 448, to peripheral bus 432. For example, storage controller 434 may be a SCSI controller and storage devices 446 may be SCSI discs. I/O device 436 may be a local area network interface, such as an Ethernet card. Secondary bus bridge 438 may provide an interface between processing system 400 and secondary bus devices 450 via secondary bus 452. For example, secondary bus bridge 438 may be a universal serial port (USB) controller and secondary bus devices 450 may be USB devices. Multimedia processor 440 may be a sound card, a video capture card, or any other type of media interface, and may also be connected to an additional device such as speakers 454. Legacy device interface 442 connects one or more legacy devices 456, such as older style keyboards and mice, to processing system 400.

Processing system 400 in FIG. 14 is only exemplary of processing systems in which the invention can be used. While FIG. 14 illustrates a processing architecture especially suitable for a general purpose computer, such as a personal computer or workstation, well known modifications can be made to configure processing system 400 to be more suitable for use in various specific applications. For example, many electronic devices that require processing may be implemented using a simpler architecture that relies on a CPU 402 connected to memory components 422 and/or memory devices 424. Modifications may include, for example, elimination of unnecessary components, addition of specialized devices or circuits, and/or integration of two or more devices.

Figure 15:
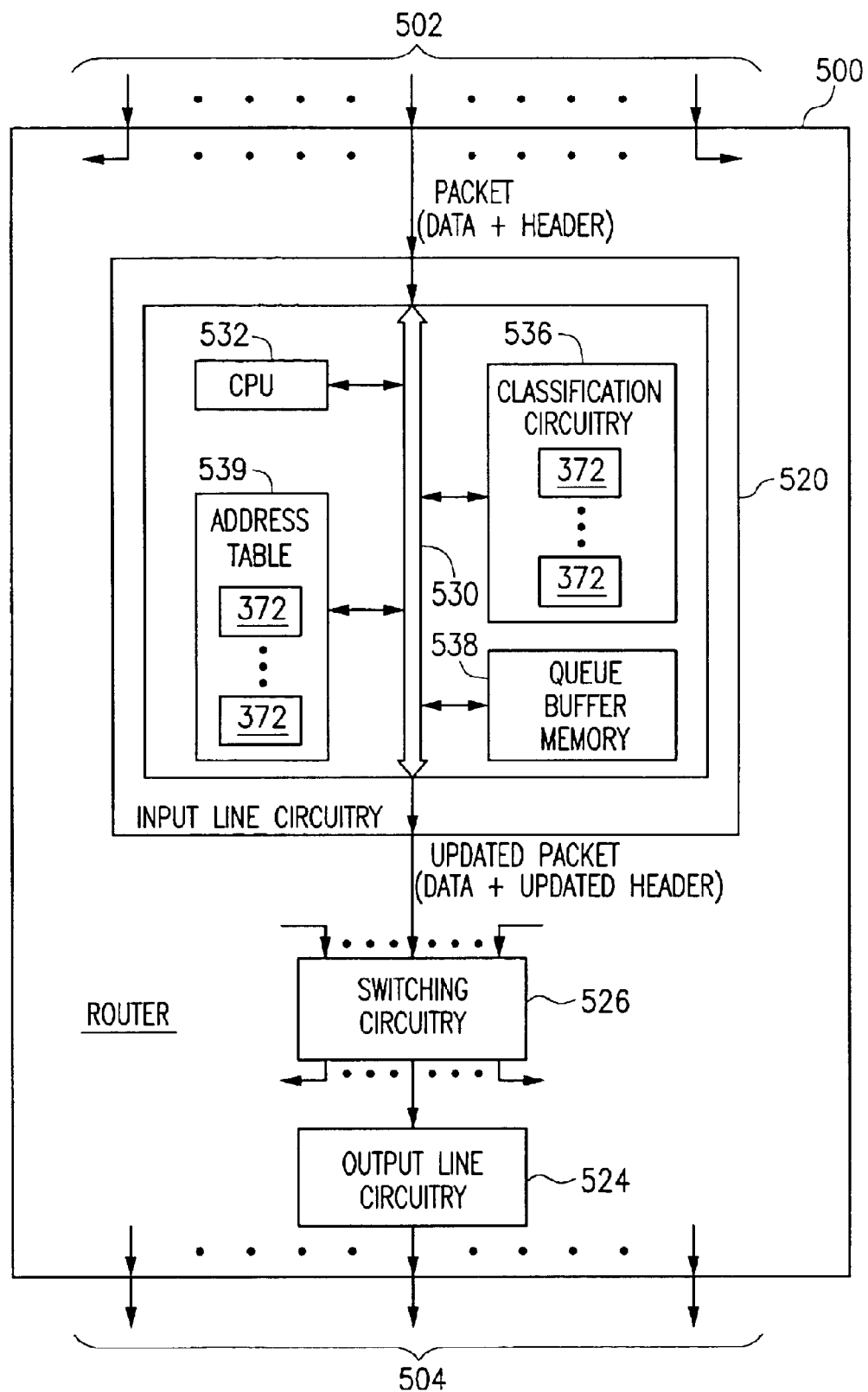
FIG. 15 is a schematic circuit diagram of a router that includes integrated circuits as in FIG. 13.

A more common application of CAM circuitry is in routers. FIG. 15 shows a simplified block diagram of a router 500 as may be used in a communications network such as the Internet backbone. Router 500 has input lines 502 and output lies 504. In applications where data is transmitted from location to location in packets, router 500 can receive a packet on input lines 502, decode a part of the packet identifying its final destination, provide forwarding instructions for the packet, and transmit the packet on output lines 504.

Router 500 includes circuitry for each input line, as illustrated by input line circuitry 520 for one of input lines 502. Router 500 similarly includes circuitry for each output line, as illustrated by output line circuitry 524 for one of output lines 504. Input line circuitry 520 and output line circuitry 524 can each be implemented as linecards, and a respective linecard can sit on each ingress or egress port. Ingress port linecards can receive input packets from input lines 502, process them, and send the resulting processed packets via switching circuitry 526 to egress port linecards. Egress port linecards can further process the packets before sending them out on output lines 504. Therefore, ingress and egress port linecards can be implemented with similar or identical circuitry, so that the same linecard could be used either as input line circuitry 520 or output line circuitry 524.

Exemplary components of input line circuitry 520 are shown, although circuitry 520 could be implemented in many different ways. Bus circuitry 530 provides communication between CPU 532 and other components, which include address table 534, classification circuitry 536, and queue buffer memory 538. Address table 534 and classification circuitry 536 each illustratively include a set of one or more CAM chips 372, as in FIG. 8. CAM chips 372 can be used to efficiently retrieve information used by CPU 532 in processing and retransmitting packets.

In operation, CPU 532 can provide a packet's internet protocol (IP) address to address table 534, where the IP address can be provided to CAM chips 372 as a search key for retrieval of an IP address for the next hop. Then CPU 532 uses the next hop's IP address to update the packet's header. CPU 532 can also provide all or part of the packet to classification circuitry 536, which can respond with information for services such as prioritization, security, accounting, traffic shaping, and so forth. Classification circuitry 536 can provide parts of the packet to CAM chips 372 as search keys for retrieval of relevant information. Upon updating the packet's header (and possibly also its data) to include the next hop IP address and possibly information from classification circuitry 536, CPU 532 can provide the packet to queue buffer memory 538, where it is stored until it can be retransmitted, such as through switching circuitry 526.

Although the invention has been described with specific reference to priority encoding for CAM applications, the invention has broader applicability and may be used in any application of priority encoding. In general, the described technique of priority encoding is applicable to priority encoding any appropriate number of input signals, not only applications with 256 input signals. Although described in combination with techniques for searching a CAM array with 1024 entries at widths 80, 160, and 320 bits, priority encoding as described can be applied to match signals from CAM arrays of other sizes, searched at a single width or at other widths, such as 640 bits or more . Also, although exemplary circuits and IC layout features have been described and illustrated, such as a product tree, a priority tree, match combining circuitry, and match and FNH bit selecting circuitry, various other circuits and layouts could be employed. Similarly, the methods described above are merely exemplary.

The above description and drawings illustrate exemplary embodiments that achieve the objects, features, and advantages of the invention, but it is not intended that the invention be limited to any illustrated or described embodiment. Any modification that comes within the spirit and scope of the following claims should be considered part of the invention.

What is claimed as new and desired to be protected by Letters Patent of the United States is:

1. A priority encoding circuit comprising:
input lines, each providing an input signal; output lines, each providing a priority signal indicating whether a respective input signal is asserted and has priority, at most one of the priority signals being asserted at a time;
first tree-like circuitry that responds to the input signals, providing subset signals; the subset signals each indicating whether any of a subset of the input signals is asserted; and
second tree-like circuitry that responds to the subset signals, providing the priority signals on die output lines.

2. The circuit of claim 1 in which the first tree-like circuitry includes static logic.

3. The circuit of claim 1 in which the second tree-like circuitry includes dynamic logic.

4. The circuit of claim 1 in which the first tree-like circuitry provides power-of-two subset signals, each indicating whether any of a power-of-two subset of the input signals is asserted.

5. The circuit of claim 1 in which the second tree-like circuitry provides each priority signal in response to a non-redundant group of the subset signals.

6. The circuit of claim 1 in which the second tree-like circuitry provides each input signal's respective priority signal independently of any other input signal's priority signal.

7. A priority encoding circuit comprising:

M input lines, each providing an input signal; M output lines, each providing a priority signal indicating whether a respective input signal is asserted and has priority, at most one of the priority signals being asserted at a time; M being equal to $2^N$; and first circuitry that responds to the M input signals, providing subset signals, each indicating whether any of a respective subset of the input signals is asserted; the subsets including, for n=0 to (N−1), $2^{N-(n+1)}$ subsets of $2^n$ input signals; and second circuitry that responds to the M input signals and the subset signals, providing the priority signals on the output lines; each of the priority signals depending on no more than N of the subset signals.

8. The circuit of claim 7 in which M is equal to sixteen and N is equal to four.

9. The circuit of claim 7 in which the first circuitry includes static logic.

10. The circuit of claim 7 in which the second circuitry includes dynamic logic.

11. A priority encoding circuit comprising:

sixteen input lines, each providing an input signal, sixteen output lines, each providing a priority signal indicating whether a respective input signal is asserted and has priority, at most one of the priority signals being asserted at a time;

first hierarchical circuitry that responds to the input signals, the first hierarchical circuitry having a first level that provides eight one-line signals, a second level that provides four two-line signals, a third level that provides two four-line signals, and a fourth level that provides one eight-line signal; and second hierarchical circuitry that responds to the input signals, the one-line signals, the two-line signals, the four-line signals, and the eight-line signal, providing the priority signals on the output lines; the second hierarchical circuitry having switching elements connected in series to control each output line; the switching elements being in levels, including:

a first level at which, for i=1 through 16, a switching element in series with an ith output line is controlled by an input signal from an ith input line;

a second level at which, for every other value of i, a switching element in series with the ith output line is controlled by an (i−1)th one-line signal;

a third level at which, for j−1 through 4, a switching element in series with (4j)th and (4j−1)th output lines is controlled by a jth two-line signal;

a fourth level at which, for k=1 through 2, a switching element in series with (8k)th through (8k−3)th output lines is controlled by a kth four-line signal; and a fifth level at which a switching element in series with ninth through sixteenth output lines is controlled by the eight-line signal.

12. The circuit of claim 11 in which the switching elements are transistors.

13. A priority encoding circuit comprising:

input lines, each providing an input signal; output lines, each providing a priority signal indicating whether a respective input signal is asserted and has priority, at most one of the priority signals being asserted at a time;

first circuitry that responds to the input signals, providing subset signals; each subset signal indicating whether any of a power-of-two subset of the input signals is asserted; and second circuitry that responds to the subset signals, providing the priority signals on the output lines; the second circuitry providing each priority signal in response to a non-redundant group of the subset signals.

14. The circuit of claim 13, with sixteen of the input lines; the subset signals including four two-line signals, two four-line signals, and one eight-line signal.

15. The circuit of claim 13 in which the second circuitry includes, for each output line, a respective series of switching elements in series that control the output line's priority signal; each output line's series of switching elements including, for each of its priority signal's non-redundant group of subset signals, a switching element controlled by the subset signal.

16. A priority encoding circuit comprising:

input lines, each providing an input signal; output lines, each providing a priority signal indicating whether a respective input signal is asserted and has priority, at most one of the priority signals being asserted at a time;

first circuitry that responds to the input signals, providing subset signals; each subset signal indicating whether any of a subset of the input signals is asserted; and second circuitry that responds to the subset signals, providing the priority signals on the output lines; the second circuitry providing each priority signal in response to a group of the subset signals; the second circuitry providing each input signal's priority signal independently of any other input signal's priority signal.

17. The circuit of claim 16 in which the second circuitry includes, for each output line, a respective series of switching elements in series that control the output line's priority signal; each output line's series of switching elements including, for each of its priority signal's group of subset signals, a switching element controlled by the subset signal; none of the switching elements being controlled by any other output line's priority signal.

18. A priority encoding circuit comprising:

input lines, each providing an input signal; output lines, each providing a priority signal indicating whether a respective input signal is asserted and has priority, at most one of the priority signals being asserted at a time;

static circuitry that responds to the input signals, providing subset signals; each subset signal indicating whether any of a subset of the input signals is asserted; and dynamic circuitry that responds to the subset signals, providing the priority signals on the output lines.

19. The circuit of claim 18 in which the static circuitry includes NOR and NAND gates.

20. The circuit of claim 18 in which the dynamic circuitry includes NMOS devices.

21. The circuit of claim 18 in which the dynamic circuitry includes, for each output line, one or more respective switching elements in series to control the output line, the switching elements forming a dynamic AND gate, the output line's priority signal being asserted only when all the respective switching elements are on.

22. The circuit of claim 18 in which the dynamic circuitry includes transistors and, for a set of the transistors, precharging circuitry for precharging the transistors.

23. A priority encoder comprising:
   lower level priority encoding circuits, each including:
      input lines, each providing an input signal;
      first tree-like circuitry that responds to the input signals, providing a set of subset signals, each indicating whether any of a subset of the input signals is asserted; the subset signals including an overall signal indicating whether any of the input signals is asserted; and
      second tree-like circuitry that responds to the subset signals, providing lower level priority signals, each lower level priority signal indicating whether a respective input signal is asserted and has priority, at most one of the lower level priority signals being asserted at a time;
   lower output lines that provide the lower level priority signals from one of the lower level priority encoders at a time; and
   an upper level priority encoding circuit including:
      upper output lines, each providing an upper level priority signal indicating whether a respective overall signal is asserted and has priority, at most one of the upper level priority signals being asserted at a time; and
      prioritizing circuitry that responds to the overall signals, providing the upper level priority signals on the upper output lines.

24. The priority encoder of claim 23 in which the first tree-like circuitry includes static logic, the second tree-like circuitry includes dynamic logic, and the prioritizing circuitry includes static logic.

25. The priority encoder of claim 23, further including lower level select circuitry that responds to the upper level priority signals, selecting one of the lower level priority encoding circuits to provide its lower level priority signals on the lower output lines.

26. A circuit comprising:
   lower level priority encoding circuits, each including:
      input lines, each providing an input signal; and
      lower prioritizing circuitry that responds to the input signals, providing lower level priority signals and a overall signal; each lower level priority signal indicating whether a respective input signal is asserted and has priority, at most one of the lower level priority signals being asserted at a time; the overall signal indicating whether any of the input signals is asserted; and
   upper level priority encoding circuitry including:
      output lines, each providing an upper level priority signal indicating whether a respective overall signal is asserted and has priority, at most one of the upper level priority signals being asserted at a time; and
      prioritizing circuitry that responds to the overall signals, providing upper level priority signals, each upper level priority signal indicating whether a respective overall signal is asserted and has priority, at most one of the upper level priority signals being asserted at a time.

27. A method of priority encoding, comprising:
   in response to input signals, obtaining subset signals, each subset signal indicating whether any of a power-of-two subset of the input signals is asserted; and
   in response to the subset signals, providing priority signals, each priority signal indicating whether a respective input signal is asserted and has priority, at most one of the priority signals being asserted at a time; each priority signal being provided in response to a non-redundant group of the subset signals.

28. A method of priority encoding, comprising:
   in response to input signals, obtaining subset signals, each subset signal indicating whether any of a subset of the input signals is asserted; and
   in response to the subset signals, providing priority signals, each priority signal indicating whether a respective input signal is asserted and has priority, at most one of the priority signals being asserted at a time; each input signal's priority signal being provided in response to a group of the subset signals; each input signal's priority signal being obtained independently of any other input signal's priority signal.

29. A method of priority encoding, comprising:
   in response to M input signals, where M is equal to $2^N$, obtaining subset signals, each subset signal indicating whether any of a subset of the input signals is asserted; the subsets including, for n=0 to (N−1), $2^{N-(n+1)}$ subsets of $2^n$ input signals; and
   in response to the input signals and the subset signals, providing priority signals on M output lines; each output line's priority signal indicating whether a respective input signal is asserted and has priority, at most one of the priority signals being asserted at a time; each of the priority signals depending on no more than N of the subset signals.

30. The method of claim 29 in which M is sixteen and N is four.

31. A method of priority encoding, comprising:
   receiving input signals on M groups of M input lines each, M being equal to $2^N$;
   in response to the input signals on each group of input lines:
      obtaining subset signals, each subset signal indicating whether any of a subset of the group of input signals is asserted; the subsets including, for n=0 to (N−1), $2^{N-(n+1)}$ subsets of $2^n$ input signals; and
      in response to the input signals on the input lines in the group and the subset signals, providing group priority signals and a group overall signal; each group priority signal indicating whether a respective input signal in the group is asserted and has priority, at most one of the group priority signals being asserted; each of the group priority signals depending on no more than N of the subset signals; the group overall signal indicating whether any of the group priority signals is asserted; and
   in response to the group overall signals of the M groups, providing a priority group overall signal for each group indicating whether the group's overall signal is asserted and has priority, at most one of the priority group overall signals being asserted.

32. The method of claim 31 in which M is sixteen and N is four.

33. An integrated circuit comprising:
a substrate with a surface;
priority encoder circuitry that responds to input signals, providing priority signals indicating an input signal that is asserted and has priority; the priority encoder circuitry including:
first circuitry that responds to a group of the input signals, providing subset signals; the subset signals each indicating whether any of a subset of the group of input signals is asserted; and
second circuitry that responds to the subset signals, providing the priority signals.

34. The integrated circuit of claim 33 in which each subset signal indicates whether any of a power-of-two subset of the input signals is asserted.

35. The integrated circuit of claim 33 in which the second circuitry provides a respective one of the priority signals for each of the input signals, the second circuitry providing each input signal's priority signal in response to a non-redundant group of the subset signals.

36. A system comprising:
a processor;
an integrated circuit connected for access by the processor, the integrated circuit including:
priority encoder circuitry that responds to input signals, providing priority signals indicating an input signal that is asserted and has priority; the priority encoder asserting at most one of the priority signals at a time; the priority encoder circuitry including:
first tree-like circuitry that responds to the input signals, providing subset signals; the subset signals each indicating whether any of a subset of the input signals is asserted; and
second tree-like circuitry that responds to the subset signals, providing the priority signals.

37. A system comprising:
a processor;
an integrated circuit connected for access by the processor, the integrated circuit including:
priority encoder circuitry that responds to input signals, providing priority signals indicating an input signal that is asserted and has priority; the priority encoder asserting at most one of the priority signals at a time; the priority encoder circuitry including:
first circuitry that responds to the input signals, providing subset signals; the subset signals each indicating whether any of a power-of-two subset of the input signals is asserted; and
second circuitry that responds to the subset signals, providing the priority signals; the second circuitry providing each priority signal in response to a non-redundant group of the subset signals.

38. A system comprising:
a processor;
an integrated circuit connected for access by the processor, the integrated circuit including:
priority encoder circuitry that responds to input signals, providing priority signals indicating an input signal that is asserted and has priority; the priority encoder asserting at most one of the priority signals at a time; the priority encoder circuitry including:
first circuitry that responds to the input signals, providing subset signals; the subset signals each indicating whether any of a subset of the input signals is asserted; and
second circuitry that responds to the subset signals, providing the priority signals; the second circuitry providing each priority signal in response to a group of the subset signals; the second circuitry providing each input signal's priority signal independently of any other input signal's priority signal.

39. A system comprising:
a processor;
an integrated circuit connected for access by the processor, the integrated circuit including:
priority encoder circuitry that responds to input signals, providing priority signals indicating an input signal that is asserted and has priority; the priority encoder asserting at most one of the priority signals at a time; the priority encoder circuitry including:
static circuitry that responds to the input signals, providing subset signals; the subset signals each indicating whether any of a subset of the input signals is asserted; and
dynamic circuitry that responds to the subset signals, providing the priority signals.

40. A system comprising:
a processor;
a CAM component connected for access by the processor, the CAM component including:
priority encoder circuitry that responds to input signals, providing priority signals indicating an input signal that is asserted and has priority; the priority encoder circuitry including:
first circuitry that responds to a group of the input signals, providing subset signals; the subset signals each indicating whether any of a subset of the group of input signals is asserted; and
second circuitry that responds to the subset signals, providing the priority signals.

41. A router comprising:
input lines that receive data transmissions;
output lines that retransmit data transmissions received on the input lines;
CAM circuitry that provides information used to retransmit data transmissions on the output lines, the CAM circuitry comprising:
priority encoder circuitry that responds to match signals, providing priority signals indicating a match signal that is asserted and has priority; the priority encoder asserting at most one of the priority signals at a time; the priority encoder circuitry including:
first tree-like circuitry that responds to the match signals, providing subset signals; the subset signals each indicating whether any of a subset of the match signals is asserted; and
second tree-like circuitry that responds to the subset signals, providing the priority signals.

42. A router comprising:
input lines that receive data transmissions;
output lines that retransmit data transmissions received on the input lines;
CAM circuitry that provides information used to retransmit data transmissions on the output lines, the CAM circuitry comprising:
priority encoder circuitry that responds to match signals, providing priority signals indicating a match signal that is asserted and has priority; the priority encoder asserting at most one of the priority signals at a time; the priority encoder circuitry including:
first circuitry that responds to the match signals, providing subset signals; the subset signals each indicating whether any of a power-of-two subset of the match signals is asserted; and second circuitry that responds to the subset signals, providing the priority signals; the second circuitry providing each priority signal in response to a non-redundant group of the subset signals.

43. A router comprising:

input lines that receive data transmissions;

output lines that retransmit data transmissions received on the input lines;

CAM circuitry that provides information used to retransmit data transmissions on the output lines, the CAM circuitry comprising:

priority encoder circuitry that responds to match signals, providing priority signals indicating a match signal that is asserted and has priority; the priority encoder asserting at most one of the priority signals at a time; the priority encoder circuitry including:

first circuitry that responds to the match signals, providing subset signals; the subset signals each indicating whether any of a subset of the match signals is asserted; and second circuitry that responds to the subset signals, providing the priority signals; the second circuitry providing each priority signal in response to a group of the subset signals; the second circuitry providing each match signal's priority signal independently of any other match signal's priority signal.

44. A router comprising:

input lines that receive data transmissions;

output lines that retransmit data transmissions received on the input lines;

CAM circuitry that provides information used to retransmit data transmissions on the output lines, the CAM circuitry comprising:

priority encoder circuitry that responds to match signals, providing priority signals indicating a match signal that is asserted and has priority; the priority encoder asserting at most one of the priority signals at a time; the priority encoder circuitry including:

static circuitry that responds to the match signals, providing subset signals; the subset signals each indicating whether any of a subset of the match signals is asserted; and dynamic circuitry that responds to the subset signals, providing the priority signals.

* * * * *